US012748889B2

(12) United States Patent
Tsuchida et al.

(10) Patent No.: US 12,748,889 B2
(45) Date of Patent: Sep. 29, 2026

(54) INFORMATION PROCESSING SYSTEM, DATA PROVIDING APPARATUS, DATA PROCESSING APPARATUS, DATA RECEIVING APPARATUS, METHOD, AND COMPUTER READABLE MEDIUM

(71) Applicant: NEC Corporation, Tokyo (JP)

(72) Inventors: Hikaru Tsuchida, Tokyo (JP); Haruna Fukuda, Tokyo (JP); Kengo Mori, Tokyo (JP); Toshiyuki Isshiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 51 days.

(21) Appl. No.: 18/848,276

(22) PCT Filed: Mar. 28, 2022

(86) PCT No.: PCT/JP2022/015023

§ 371 (c)(1),
(2) Date: Sep. 18, 2024

(87) PCT Pub. No.: WO2023/187908

PCT Pub. Date: Oct. 5, 2023

(65) Prior Publication Data

US 2025/0209205 A1 Jun. 26, 2025

(51) Int. Cl.
*G06F 21/62* (2013.01)

(52) U.S. Cl.
CPC ................................ *G06F 21/6254* (2013.01)

(58) Field of Classification Search
CPC ...... G06F 21/6254; G06F 21/62; G06F 21/64; G06F 21/60
See application file for complete search history.

(56) References Cited

U.S. PATENT DOCUMENTS

2014/0181988 A1* 6/2014 Umeda ............... G06F 21/6254
726/26
2023/0091509 A1* 3/2023 Fritzhanns ......... G06Q 20/3825
705/74

FOREIGN PATENT DOCUMENTS

JP 2020-077256 A 5/2020
KR 10-2018-0104473 A 9/2018
WO 2021/245806 A1 12/2021

OTHER PUBLICATIONS

JP Official Communication for JP Application No. 2024-510598, mailed on Jun. 24, 2025 with English Translation.

(Continued)

*Primary Examiner* — Olugbenga O Idowu

(57) ABSTRACT

A data providing apparatus acquires a plurality of range proof data, generates a digital signature for each of the range proof data, and transmits a data set, a sanitizable signature, the range proof data, and the digital signature to a data processing apparatus. The data processing apparatus performs a process for performing generalizing processing for processing-target data, performs a process for the sanitizable signature, and selects range proof data corresponding to a range of a generalized attribute value. The data processing apparatus transmits the processed data set, the processed sanitizable signature, the selected range proof data, and the digital signature corresponding to this range proof data to a data receiving apparatus. The data receiving apparatus verifies the sanitizable signature, verifies the digital signature corresponding to the range proof data, and verifies the range proof data.

26 Claims, 12 Drawing Sheets

(56) References Cited

OTHER PUBLICATIONS

Haruna Higo et al., "A Study on Digital Signature Considering Data Anonymization", Proceedings of 2022 Symposium on Cryptography and Information Security, Japan, Jan. 12, 2022.
International Search Report for PCT Application No. PCT/JP2022/015023, mailed on Jun. 14, 2022.
G. Ateniese, D. H. Chou, B. de Medeiros, and G. Tsudik, "Sanitizable signatures", In ESORICS, vol. 3679 of Lecture Notes in Computer Science, pp. 159-177. Springer, 2005 URL: https://link.springer.com/content/pdf/10.1007%2F11555827_10.pdf.
Yuval Ishai, Eyal Kushilevitz, Rafail Ostrovsky, and Amit Sahai, "Zero-Knowledge from Secure Multiparty Computation", Invited and Accepted to SIAM Journal on Computing (SICOMP) Special Issue Devoted to STOC-2007 URL: https://web.cs.ucla.edu/~rafail/PUBLIC/77.pdf.
Zhengjun Cao, "An Efficient Range-Bounded Commitment Scheme", IACR Cryptol. ePrint Arch. 2007 (2007): 376, URL: https://eprint.iacr.org/2007/376.pdf.
Fujiwara, Keisei et al., Proposal of Sanitizing Anonymization Method for Verification of Anonymization, Proceedings of 2019 Symposium on Cryptography and Information Security (SCIS2019), 4A1-4, pp. 1-7, Jan. 15, 2019.

* cited by examiner

Da1

| | Attribute #1 | Attribute #2 | ... | Attribute #N |
|---|---|---|---|---|
| Row #1 | Attribute Value #11 | Attribute Value #12 | ... | Attribute Value #1N |
| ... | ... | ... | ... | ... |
| Row #M | Attribute Value #M1 | Attribute Value #M2 | ... | Attribute Value #MN |

Row To Be Processed

Row Not To Be Processed

Fig. 8

Protocol $PK_{CFT}(x, r : E = E(x, r) \wedge x \in [-2^{t+l}b, 2^{t+l}b])$

1. Alice picks random $\omega \in_R [0, 2^{t+l}b - 1]$ and $\eta_R[-2^{t+l+s}n + 1, 2^{t+l+s}n - 1]$, and then computes $W = g^{\omega}h^{\eta}$ mod $n$.
2. Then, she computes $C = H(W)$ and $c = C$ mod $2^t$.
3. Finally, she computes $D_1 = \omega + xc$ and $D_2 = \eta + rc$ (in $\mathbb{Z}$). If $D_1 \in [cb, 2^{t+l}b - 1]$, she sends $(C, D_1, D_2)$ to Bob, otherwise she starts again the protocol.
4. Bob checks that $D_1 \in [cb, 2^{t+l}b - 1]$ and that $C = H(g^{D_1}h^{D_2}E^{-c})$. This convinces Bob that $x \in [-2^{t+l}b, 2^{t+l}b]$.

Fig. 9

INFORMATION PROCESSING SYSTEM, DATA PROVIDING APPARATUS, DATA PROCESSING APPARATUS, DATA RECEIVING APPARATUS, METHOD, AND COMPUTER READABLE MEDIUM

This application is a National Stage Entry of PCT/JP2022/015023 filed on Mar. 28, 2022, the contents of all of which are incorporated herein by reference, in their entirety.

TECHNICAL FIELD

The present disclosure relates to an information processing system, a data providing apparatus, a data processing apparatus, a data receiving apparatus, a method, and a computer readable medium.

BACKGROUND ART

Recently, the use of anonymous processing information (anonymized data) on the premise that personal information should be appropriately protected has been increasing. When a researcher or the like uses anonymized data, it is important to ensure that the data has not been illegitimately altered (i.e., to ensure the validity of the data) in order to ensure the validity of the result of the use of the data. That is, when illegitimate data is used, knowledge obtained from the data will also be illegitimate, and thus measures and services that are provided based on the data may be inappropriate. A digital signature technology is one of technologies by which it is possible to verify that electronic data has not been altered. However, in the case where a digital signature is simply applied to data, when the data is anonymized, the data is altered by the anonymization, and therefore the validity thereof may not be verified.

In connection with the above-described technology, Patent Literature 1 discloses an anonymization system capable of verifying the validity of an anonymization process for data even after the anonymization process, which is deletion, replacement, or the like, is carried out. In Patent Literature 1, an anonymized-data providing server performs a patient data record extending process and stores (i.e., records) the processing result in an extended patient data table. Then, the anonymized data providing server performs a signature generation process for generating a digital signature by using the data recorded in the extended patient data table as an input, and makes an anonymized-data user terminal acquire a value of the generated signature together with a patient data name from which the signature was generated through Web server registration. Upon receiving an anonymized-data acquisition request, the anonymized-data providing server performs a verifiable anonymization process by using the patient data name and an anonymization condition as an input, generates anonymized data, and makes the anonymized-data user terminal acquire the generated anonymized data. The anonymized-data user terminal performs a signature verification process by using the anonymized data and the signature value as an input, and verifies the validity of the anonymized data.

Further, Non-patent Literature 1 discloses a chameleon hash-based sanitizable signature. This technology enables a data processing entity to perform arbitrary processing for the data of interest while guaranteeing the authenticity of the data. Further, Non-patent Literature 2 and Non-patent Literature 3 also disclose examples of proof protocols related to the present disclosure.

CITATION LIST

Patent Literature

Patent Literature 1: Japanese Unexamined Patent Application Publication No. 2020-077256

Non Patent Literature

Non-patent Literature 1: G. Ateniese, D. H. Chou, B. de Medeiros, and G. Tsudik, "Sanitizable signatures", In ESORICS, Vol. 3679 of Lecture Notes in Computer Science, pp. 159-177. Springer, 2005, URL: https://link.springer.com/content/pdf/10.1007%2F11555827_10.pdf Non-patent Literature 2: Yuval Ishai, Eyal Kushilevitz, Rafail Ostrovsky, and Amit Sahai, "Zero-Knowledge from Secure Multiparty Computation", INVITED AND ACCEPTED TO SIAM JOURNAL ON COMPUTING (SICOMP) SPECIAL ISSUE DEVOTED TO STOC-2007, URL: https://web.cs.ucla.edu/~rafail/PUBLIC/77.pdf Non-patent Literature 3: Zhengjun Cao, "An Efficient Range-Bounded Commitment Scheme", IACR Cryptol. ePrint Arch. 2007 2007:376, URL: https://eprint.iacr.org/2007/376.pdf

SUMMARY OF INVENTION

Technical Problem

In the technology disclosed in Patent Literature 1, there is a possibility that the flexibility of data processing performed by the data processing entity may be impaired. Therefore, in the technology disclosed in Patent Literature 1, there is a possibility that the data cannot be appropriately processed. Further, if it is attempted to achieve satisfactory processing flexibility in Patent Literature 1, there is a possibility that the processing cannot be efficiently performed. Further, in the case of the technology disclosed in Non-patent Literature 1, in which a data processing entity can perform arbitrary processing, there is a possibility that it is not possible to guarantee (i.e., determine) whether or not the original data has been appropriately generalized. Therefore, in the above-described technology, there is a possibility that the data cannot be appropriately processed.

The present disclosure has been made in order to solve the above-described problems, and an object thereof is to provide a system, an apparatus, a method, and a program capable of appropriately processing data while efficiently performing the process.

Solution to Problem

An information processing system according to the present disclosure includes: a data providing apparatus configured to provide a data set including a plurality of data about at least one attribute: a data processing apparatus configured to process at least one of the plurality of data; and a data receiving apparatus configured to receive the data set of which at least one data has already been processed, in which the data providing apparatus includes: sanitizable signature generation means for generating a sanitizable signature with which it is possible to perform arbitrary generalizing processing for processing-target data that is permitted to be processed: range proof acquisition means for acquiring a plurality of range proof data, each of the plurality of range proof data being data for proving that when generalizing processing is performed for an attribute value of the processing-target data, the not-yet-processed attribute value falls within a range of a generalized attribute value: signature generation means for generating a digital signature for each of the range proof data; and first transmitting means for transmitting the data set, the sanitizable signature, the range proof data, and the digital signature to the data processing apparatus, the data processing apparatus includes: processing performing means for performing a process for performing generalizing processing for the processing-target data: sanitizable signature processing means for performing a process for the sanitizable signature by using the not-yet-processed processing-target data and the already-processed processing-target data: range proof selecting means for selecting, for each of the processing-target data that have been subjected to the generalizing processing, the range proof data corresponding to the range of the generalized attribute value from among the plurality of the range proof data; and second transmitting means for transmitting, to the data receiving apparatus, the data set of which the processing-target data have already been processed, the processed sanitizable signature, the range proof data selected for the respective processing-target data, and the digital signatures corresponding to the respective range proof data, and the data receiving apparatus includes: sanitizable signature verification means for verifying the data set of which the processing-target data have already been processed and the sanitizable signature processed by the data processing apparatus: digital signature verification means for verifying the digital signatures corresponding to the range proof data selected by the data processing apparatus; and range proof verification means for verifying the range proof data selected by the data processing apparatus.

Further, a data providing apparatus according to the present disclosure includes: sanitizable signature generation means for generating a sanitizable signature with which it is possible to perform arbitrary generalizing processing for processing-target data that is permitted to be processed, the processing-target data being data included in a data set including a plurality of data about at least one attribute: range proof acquisition means for acquiring a plurality of range proof data, each of the plurality of range proof data being data for proving that when generalizing processing is performed for an attribute value of the processing-target data, the not-yet-processed attribute value falls within a range of a generalized attribute value: signature generation means for generating a digital signature for each of the plurality of range proof data; and transmitting means for transmitting the data set, the sanitizable signature, the range proof data, and the digital signatures corresponding to the range proof data to a data processing apparatus, the data processing apparatus being configured to process at least one of the plurality of data.

Further, a data processing apparatus according to the present disclosure includes: processing performing means for performing a process for performing generalizing processing for processing-target data that is permitted to be processed, the processing-target data being data included in a data set including a plurality of data about at least one attribute, provided by a data providing apparatus, the data providing apparatus being configured to provide the data set: sanitizable signature processing means for performing a process for a sanitizable signature by using the not-yet-processed processing-target data and the already-processed processing-target data, the sanitizable signature being generated for the processing-target data by the data providing apparatus and being a signature with which it is possible to perform arbitrary generalizing processing therefor: range proof selecting means for selecting, from among a plurality of range proof data acquired by the data providing apparatus, one corresponding to a range of a generalized attribute value for each of the processing-target data that have been subjected to the generalizing processing, each of the plurality of range proof data being data for proving that a not-yet-processed attribute value falls within the range of the generalized attribute value; and transmitting means for transmitting, to a data receiving apparatus, the data set of which the processing-target data have already been processed, the processed sanitizable signature, the range proof data selected for the respective processing-target data, and the digital signatures generated by the data providing apparatus and corresponding to the respective range proof data, the data receiving apparatus being configured to receive the data set of which at least one data has already been processed.

Further, a data receiving apparatus according to the present disclosure includes: sanitizable signature verification means for verifying a data set including a plurality of data about at least one attribute and a sanitizable signature, the data set being provided by a data providing apparatus and of which processing-target data that is permitted to be processed has already been processed by a data processing apparatus, the sanitizable signature being obtained by processing, by the data processing apparatus, a sanitizable signature which is generated for the processing-target data by the data providing apparatus and with which it is possible to perform arbitrary generalizing processing therefor, and the data providing apparatus being configured to provide the data set: digital signature verification means for verifying, for each of the processing-target data that have been subjected to the generalizing processing, a digital signature corresponding to, among a plurality of range proof data acquired by the data providing apparatus, one selected by the data processing apparatus, each of the plurality of range proof data being data for proving that a not-yet-processed attribute value falls within a range of a generalized attribute value; and range proof verification means for verifying the range proof data selected by the data processing apparatus.

Further, an information processing method according to the present disclosure includes, by a data providing apparatus configured to provide a data set including a plurality of data about at least one attribute, generating a sanitizable signature with which it is possible to perform arbitrary generalizing processing for processing-target data that is permitted to be processed: acquiring a plurality of range proof data, each of the plurality of range proof data being data for proving that when generalizing processing is performed for an attribute value of the processing-target data, the not-yet-processed attribute value falls within a range of a generalized attribute value: generating a digital signature for each of the range proof data; and transmitting the data set, the sanitizable signature, the range proof data, and the digital signature to a data processing apparatus, the data processing apparatus being configured to process at least one of the plurality of data, by the data processing apparatus, performing a process for performing generalizing processing for the processing-target data: performing a process for the sanitizable signature by using the not-yet-processed processing-target data and the already-processed processing-target data: selecting, for each of the processing-target data that have been subjected to the generalizing processing, the range proof data corresponding to the range of the generalized attribute value from among the plurality of the range proof data; and transmitting, to a data receiving apparatus, the data set of which the processing-target data have already been processed, the processed sanitizable signature, the range proof data selected for the respective processing-target data, and the digital signatures corresponding to the respective range proof data, the data receiving apparatus being configured to receive the data set of which at least one data has already been processed, and by the data receiving apparatus, verifying the data set of which the processing-target data have already been processed and the sanitizable signature processed by the data processing apparatus: verifying the digital signatures corresponding to the range proof data selected by the data processing apparatus; and verifying the range proof data selected by the data processing apparatus.

Further, a data providing method according to the present disclosure includes: generating a sanitizable signature with which it is possible to perform arbitrary generalizing processing for processing-target data that is permitted to be processed, the processing-target data being data included in a data set including a plurality of data about at least one attribute: acquiring a plurality of range proof data, each of the plurality of range proof data being data for proving that when generalizing processing is performed for an attribute value of the processing-target data, the not-yet-processed attribute value falls within a range of a generalized attribute value: generating a digital signature for each of the plurality of range proof data; and transmitting the data set, the sanitizable signature, the range proof data, and the digital signatures corresponding to the range proof data to a data processing apparatus, the data processing apparatus being configured to process at least one of the plurality of data.

Further, a data processing method according to the present disclosure includes: performing a process for performing generalizing processing for processing-target data that is permitted to be processed, the processing-target data being data included in a data set including a plurality of data about at least one attribute, provided by a data providing apparatus, the data providing apparatus being configured to provide the data set: performing a process for a sanitizable signature by using the not-yet-processed processing-target data and the already-processed processing-target data, the sanitizable signature being generated for the processing-target data by the data providing apparatus and being a signature with which it is possible to perform arbitrary generalizing processing therefor: selecting, from among a plurality of range proof data acquired by the data providing apparatus, one corresponding to a range of a generalized attribute value for each of the processing-target data that have been subjected to the generalizing processing, each of the plurality of range proof data being data for proving that a not-yet-processed attribute value falls within the range of the generalized attribute value; and transmitting, to a data receiving apparatus, the data set of which the processing-target data have already been processed, the processed sanitizable signature, the range proof data selected for the respective processing-target data, and the digital signatures generated by the data providing apparatus and corresponding to the respective range proof data, the data receiving apparatus being configured to receive the data set of which at least one data has already been processed.

Further, a data receiving method according to the present disclosure includes: verifying a data set including a plurality of data about at least one attribute and a sanitizable signature, the data set being provided by a data providing apparatus and of which processing-target data that is permitted to be processed has already been processed by a data processing apparatus, the sanitizable signature being obtained by processing, by the data processing apparatus, a sanitizable signature which is generated for the processing-target data by the data providing apparatus and with which it is possible to perform arbitrary generalizing processing therefor, and the data providing apparatus being configured to provide the data set: verifying, for each of the processing-target data that have been subjected to the generalizing processing, a digital signature corresponding to, among a plurality of range proof data acquired by the data providing apparatus, one selected by the data processing apparatus, each of the plurality of range proof data being data for proving that a not-yet-processed attribute value falls within a range of a generalized attribute value; and verifying the range proof data selected by the data processing apparatus.

Further, a first program according to the present disclosure causes a computer to perform: a step of generating a sanitizable signature with which it is possible to perform arbitrary generalizing processing for processing-target data that is permitted to be processed, the processing-target data being data included in a data set including a plurality of data about at least one attribute: a step of acquiring a plurality of range proof data, each of the plurality of range proof data being data for proving that when generalizing processing is performed for an attribute value of the processing-target data, the not-yet-processed attribute value falls within a range of a generalized attribute value: a step of generating a digital signature for each of the plurality of range proof data; and a step of transmitting the data set, the sanitizable signature, the range proof data, and the digital signatures corresponding to the range proof data to a data processing apparatus, the data processing apparatus being configured to process at least one of the plurality of data.

Further, a second program according to the present disclosure causes a computer to perform: a step of performing a process for performing generalizing processing for processing-target data that is permitted to be processed, the processing-target data being data included in a data set including a plurality of data about at least one attribute, provided by a data providing apparatus, the data providing apparatus being configured to provide the data set: a step of performing a process for a sanitizable signature by using the not-yet-processed processing-target data and the already-processed processing-target data, the sanitizable signature being generated for the processing-target data by the data providing apparatus and being a signature with which it is possible to perform arbitrary generalizing processing therefor: a step of selecting, from among a plurality of range proof data acquired by the data providing apparatus, one corresponding to a range of a generalized attribute value for each of the processing-target data that have been subjected to the generalizing processing, each of the plurality of range proof data being data for proving that a not-yet-processed attribute value falls within the range of the generalized attribute value; and a step of transmitting, to a data receiving apparatus, the data set of which the processing-target data have already been processed, the processed sanitizable signature, the range proof data selected for the respective processing-target data, and the digital signatures generated by the data providing apparatus and corresponding to the respective range proof data, the data receiving apparatus being configured to receive the data set of which at least one data has already been processed.

Further, a third program according to the present disclosure causes a computer to perform: a step of verifying a data set including a plurality of data about at least one attribute and a sanitizable signature, the data set being provided by a data providing apparatus and of which processing-target data that is permitted to be processed has already been processed by a data processing apparatus, the sanitizable signature being obtained by processing, by the data processing apparatus, a sanitizable signature which is generated for the processing-target data by the data providing apparatus and with which it is possible to perform arbitrary generalizing processing therefor, and the data providing apparatus being configured to provide the data set: a step of verifying, for each of the processing-target data that have been subjected to the generalizing processing, a digital signature corresponding to, among a plurality of range proof data acquired by the data providing apparatus, one selected by the data processing apparatus, each of the plurality of range proof data being data for proving that a not-yet-processed attribute value falls within a range of a generalized attribute value; and a step of verifying the range proof data selected by the data processing apparatus.

Advantageous Effects of Invention

According to the present disclosure, it is possible to provide a system, an apparatus, a method, and a program capable of appropriately processing data while efficiently performing the process.

BRIEF DESCRIPTION OF DRAWINGS

FIG. 8 shows a table for explaining a data set according to the second example embodiment:

FIG. 9 shows an example of a non-interactive zero-knowledge proof algorithm used for generating range proof data by a range proof acquisition unit according to the second example embodiment;

EXAMPLE EMBODIMENT

Outline of Example Embodiment

Figure 1:
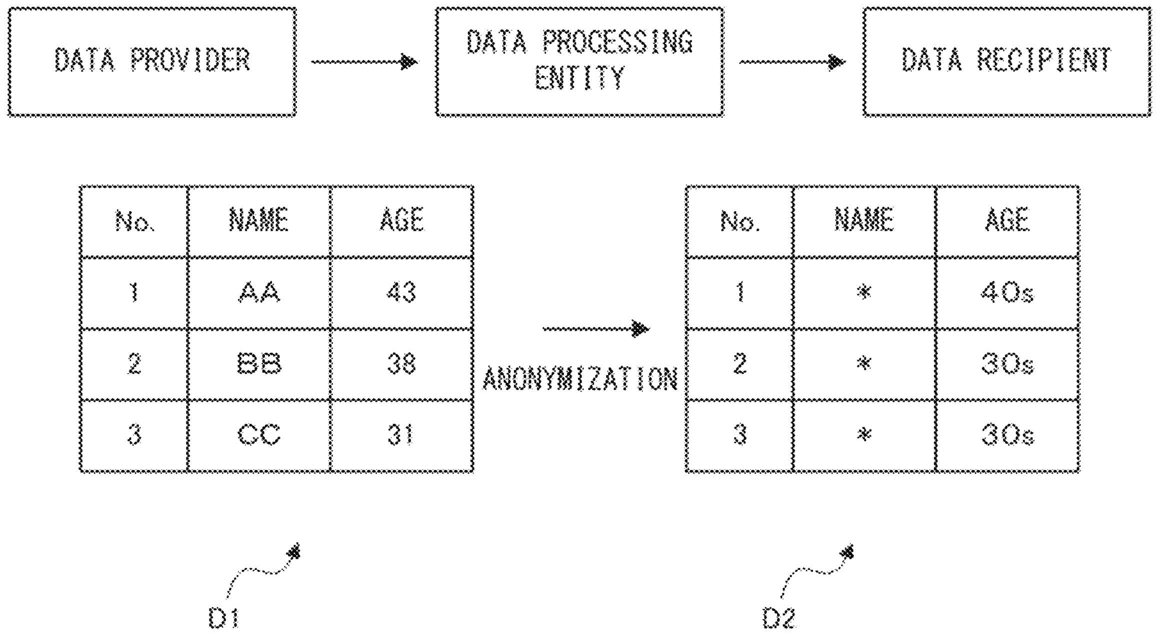
FIG. 1 shows a diagram and tables for explaining a comparative example.

Prior to describing an example embodiment, an outline of an example embodiment will be described. Note that although example embodiments will be described hereinafter, the following example embodiments are not intended to limit the invention specified by the claims. Further, not all combinations of features described in the example embodiments are essential for the means for solving the invention. Further, indices (alphabet) used in the following description may not be common throughout this specification.

Firstly, a general flow of data for signature verification involving anonymizing processing will be described. For example, original data (data set: plaintext) is composed of at least one record. The record is a unit for a chunk of data. When the original data is medical data, the record contains at least one data about a certain patient. Further, for example, the original data is composed of at least one attribute. The attribute indicates the type of the data. Examples of attributes include a name, an address, an age, a gender, and the like corresponding to each record. Further, for example, the original data may be in a table format with rows and columns. In this case, each row may correspond to a record and each column may correspond to an attribute. Each data corresponding to each cell in the table format has an attribute value corresponding to the attribute. When the attribute is an "address", the attribute value may indicate, for example, "Tokyo", "Kanagawa", "Osaka", or the like. Further, when the attribute is an "Age", the attribute value may indicate, for example, "25 years old", "34 years old", "43 years old", or the like.

Further, a data provider (i.e., a data providing entity) which provides original data (data set) may generate a signature (electronic signature: digital signature) for the original data by using a random number, and send the original data and the signature to a data processing entity. The data processing entity processes the original data (anonymizing processing), and sends the processed data and the signature to a data recipient (i.e., a data receiving entity). Examples of the processing (anonymizing processing) include "generalization". The "generalization" is processing for generalizing (abstracting) an attribute value. The data recipient (data verifier) verifies the signature by using the processed data and the signature, and thereby verifies the validity of the processed data. The data recipient can use the processed data of which the validity has been verified.

A comparative example will be described hereinafter before describing this example embodiment. In the above-described technology disclosed in Patent Literature 1, it is necessary to add each value in an abstraction pattern group (such as a generalized hierarchical tree), which is a substitution candidate, to patient data in the patient data record extending process. Therefore, in Patent Literature 1, a data provider or the like needs to designate a rule for abstraction (generalization) such as an abstraction pattern group. Accordingly, in Patent Literature 1, the flexibility of data processing performed by the data processing entity may be impaired. Further, if it is attempted to achieve satisfactory processing flexibility in Patent Literature 1, the number of patterns in the abstraction pattern group increases, so that the computational load may increase. Therefore, in the technology disclosed in Patent Literature 1, the processing may not be efficiently performed. Note that in the technology disclosed in Patent Literature 1, if the data processing entity does not perform processing according to the rule for generalization, the verification of a signature will fail. Meanwhile, in the case of the sanitizable signature using a chameleon hash function as in the technology disclosed in Non-patent Literature 1, the data processing entity or the like can perform arbitrary generalizing processing.

FIG. 1 shows a diagram and tables for explaining a comparative example. FIG. 1 shows a diagram and tables for explaining a case in which a sanitizable signature which can be processed in an arbitrary manner is performed (e.g., generated). FIG. 1 shows an example in which a data set having two attribute columns "Name" and "Age" is processed. A data provider provides a data set D1, which is the original data, to a data processing entity. In the data set D1 shown in FIG. 1, an attribute value of the attribute "Age" in a record corresponding to a name "AA" in the first row is "43". Further, an attribute value of the attribute "Age" in a record corresponding to a name "BB" in the second row is "38". Further, an attribute value of the attribute "Age" in a record corresponding to a name "CC" in the third row is "31"

In the record in the first row, the data processing entity deletes (anonymizes) the attribute value "AA" of the attribute "Name", and generalizes (anonymizes) the attribute value "43" of the attribute "Age" to an attribute value "40 s". Further, in the record of the second row, the data processing entity deletes (anonymizes) the attribute value "BB" of the attribute "Name", and generalizes (anonymizes) the attribute value "38" of the attribute "Age" to an attribute value "30 s". Further, in the record of the third row, the data processing entity deletes (anonymizes) the attribute value "CC" of the attribute "Name", and generalizes (anonymizes) the attribute value "31" of the attribute "Age" to the attribute value "30 s". In this way, the data processing entity generates anonymized data D2 and sends the generated anonymized data D2 to a data recipient.

In the example shown in FIG. 1, the attribute value of the attribute "Age" is generalized. Note that when a sanitizable signature which can be subjected to arbitrary generalizing processing is applied, the data processing entity can perform arbitrary generalizing processing therefor. Therefore, there is a possibility that it may not be possible to guarantee (i.e., determine) whether or not a not-yet-processed attribute value (i.e., an attribute value that has not been processed yet) actually has fallen within the range of the generalized already-processed attribute value (i.e., an attribute value that has already been processed and thereby generalized). For example, for the record in the first row, the attribute value of the attribute "Age" has been generalized to "40 s", but it may not be possible to guarantee (i.e., determine) whether or not the not-yet-processed attribute value was actually one of 40 to 49 years old. That is, for example, when the not-yet-processed attribute value was "35", but the data processing entity has accidentally changed the attribute value to "40 s", the data recipient may not be able to check (i.e., find out) the fact that the original attribute value was not "40 s".

In contrast, as will be described hereinafter, a system according to this example embodiment is configured so that a data provider acquires a plurality of range proof data each of which is data for proving that the not-yet-processed attribute value falls within the range of the generalized attribute value. Further, the system according to this example embodiment is configured so that a data processing entity selects range proof data corresponding to the range of the generalized attribute value. Further, the system is configured so that a data recipient performs verification by using the selected range proof data. Therefore, in this example embodiment, it is possible to appropriately process data while efficiently performing the process.

First Example Embodiment

An example embodiment will be described hereinafter with reference to the drawings. In order to clarify the explanation, the following descriptions and drawings are omitted and simplified as appropriate. Further, the same elements are assigned the same reference numerals (or symbols) throughout the drawings, and redundant descriptions thereof are omitted as appropriate.

Figure 2:
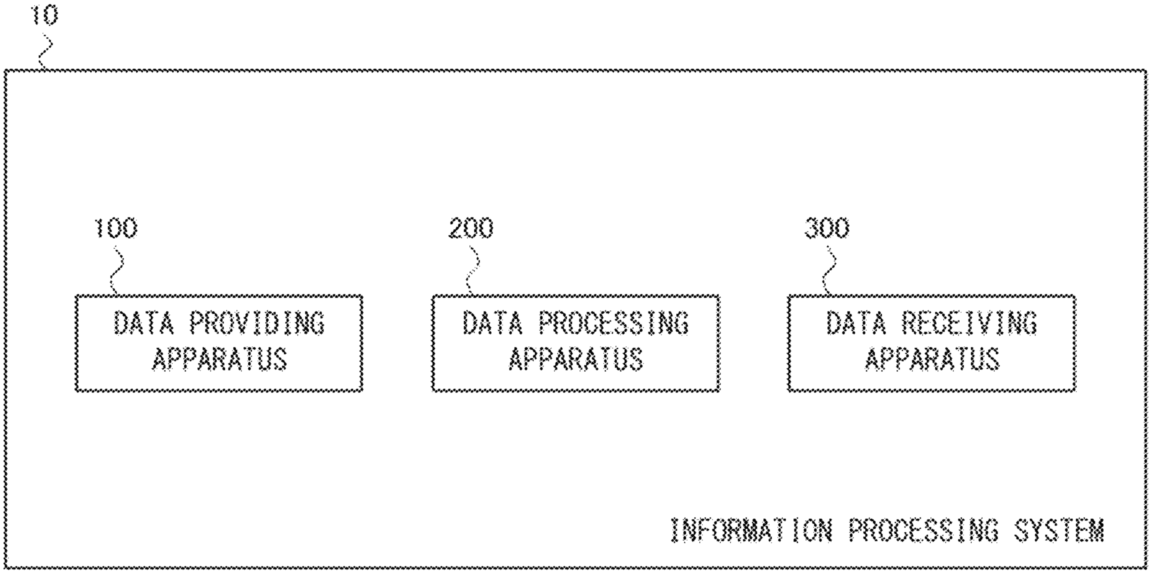
FIG. 2 shows a configuration of an information processing system according to a first example embodiment.

FIG. 2 shows a configuration of an information processing system 10 according to a first example embodiment. The information processing system 10 includes a data providing apparatus 100, a data processing apparatus 200, and a data receiving apparatus 300. Although the data providing apparatus 100, the data processing apparatus 200, and the data receiving apparatus 300 are physically separated from each other in this example, they may be integrally formed. The data providing apparatus 100, the data processing apparatus 200, and the data receiving apparatus 300 are connected to each other through a wire or wirelessly so that they can communicate with each other. The data providing apparatus 100 may be managed by the above-described data provider. The data processing apparatus 200 may be managed by the above-described data processing entity. The data receiving apparatus 300 may be managed by the above-described data recipient.

By the above-described apparatuses, the information processing system 10 generates a signature for data (data set) to be provided, processes (anonymizes) at least a part of the data, and verifies the signature for the data set of which the at least part of the data has been processed. Details of these features will be described later. Note that the information processing system 10 may also function as a digital signature system (a signature system or an electronic signature system) for putting a digital signature (an electronic signature), a data processing system for processing data, or a signature verification system (a verification system) for verifying a signature.

The data providing apparatus 100 is configured to provide a data set composed of a plurality of data about at least one attribute. The data processing apparatus 200 is configured to process at least one of the plurality of data. The data receiving apparatus 300 is configured to receive the data set of which at least one data has been processed. Details of these features will be described later.

Figure 3:
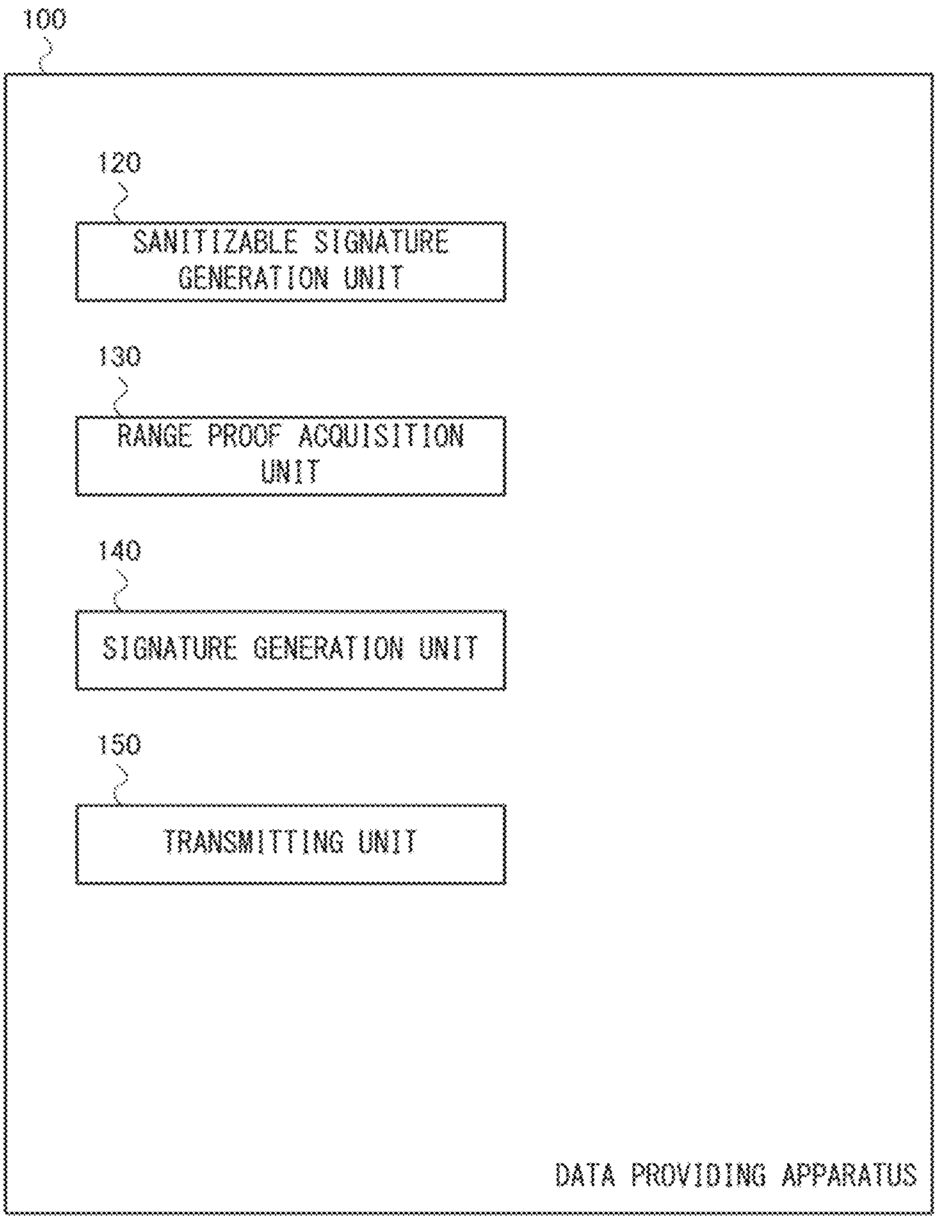
FIG. 3 shows a configuration of a data providing apparatus according to the first example embodiment.

FIG. 3 shows a configuration of the data providing apparatus 100 according to the first example embodiment. The data providing apparatus 100 includes, as its components, a sanitizable signature generation unit 120, a range proof acquisition unit 130, a signature generation unit 140, and a transmitting unit 150. The sanitizable signature generation unit 120 functions as sanitizable signature generation means (first signature generation means). The range proof acquisition unit 130 functions as range proof acquisition means. The signature generation unit 140 functions as signature generation means (second signature generation means: range proof signature generation means). The transmitting unit 150 functions as transmitting means (first transmitting means).

A data set composed of a plurality of data about at least one attribute is input to the data providing apparatus 100 by a data provider. Then, the data providing apparatus 100 provides the data set. As described above, the data set is composed of at least one record and at least one attribute. Further, as described above, the data set may be formed, for example, in a table format with rows and columns. Further, each row may correspond to a record, and each column may correspond to an attribute. The data set may be, for example, but is not limited to, medical data of a plurality of patients. Further, the data providing apparatus 100 generates a sanitizable signature which is a digital signature with which it is possible to perform anonymizing processing for provided data (data set). Note that the data providing apparatus 100 may also function as a signature generation apparatus (sanitizable signature generation apparatus) that generates a digital signature (electronic signature).

The data providing apparatus 100 may be implemented by, for example, an information processing apparatus such as a computer. That is, the data providing apparatus 100 includes an arithmetic apparatus such as a CPU (Central Processing Unit) and a storage device such as a memory or a disk. The data providing apparatus 100 implements each of the above-described components by, for example, having the arithmetic apparatus execute a program stored in the storage device. This feature also applies to other example embodiments described later.

The sanitizable signature generation unit 120 generates a sanitizable signature with which it is possible to perform arbitrary generalizing processing for processing-target data that is permitted to be processed. Note that the sanitizable signature generation unit 120 may generate a signature with which it is impossible to perform processing for data that is not permitted to be processed. Note that the sanitizable signature is, for example, but is not limited to, a sanitizable signature related to a digital signature to which a chameleon hash has been applied. A specific process performed by the sanitizable signature generation unit 120 will be described later.

The range proof acquisition unit 130 acquires a plurality of range proof data each of which is data for proving that when generalizing processing is performed for an attribute value of the processing-target data, the not-yet-processed attribute value falls within the range of the generalized attribute value. The range proof acquisition unit 130 may generate a plurality of range proof data, but the present disclosure is not limited to such an example. The range proof acquisition unit 130 may acquire (receive) range proof data from other apparatuses or the like. Alternatively, the range proof acquisition unit 130 may acquire range proof data by having a user (data provider) enter the range proof data into the data providing apparatus 100 through his/her (its) operation. The range proof data may be generated by using, for example, a proof protocol based on zero-knowledge proof or a proof protocol based on non-interactive zero-knowledge proof, but the present disclosure is not limited to such examples. A specific process performed by the range proof acquisition unit 130 will be described later.

The signature generation unit 140 generates a digital signature for each of the plurality of range proof data. A specific process performed by the signature generation unit 140 will be described later. The transmitting unit 150 transmits the data set, the sanitizable signature, the range proof data, and the digital signatures corresponding to the range proof data to the data processing apparatus 200. A specific process performed by the transmitting unit 150 will be described later. Note that the data providing apparatus 100 may temporarily store therein the information to be transmitted before transmitting the information to the data processing apparatus 200.

Figure 4:
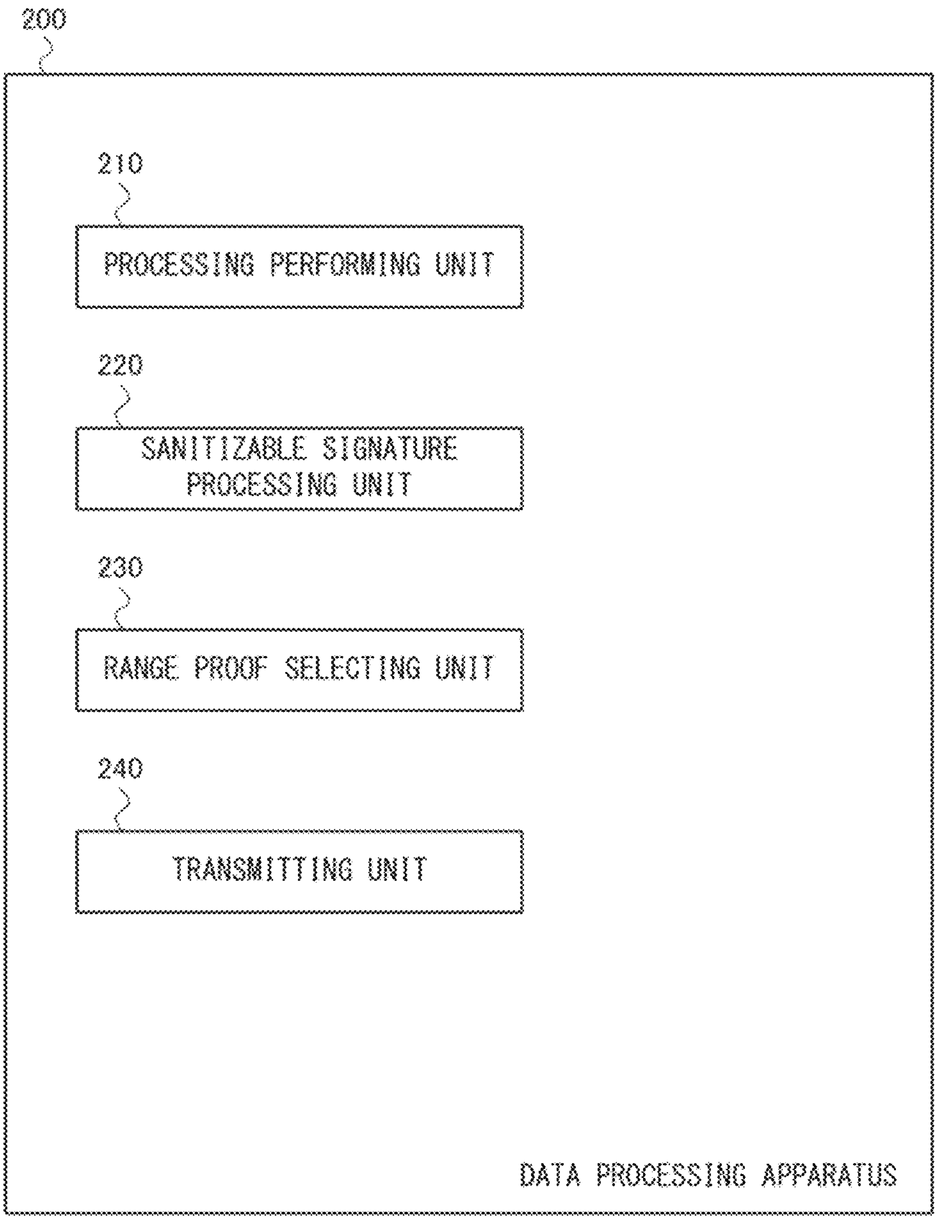
FIG. 4 shows a configuration of a data processing apparatus according to the first example embodiment.

FIG. 4 shows a configuration of the data processing apparatus 200 according to the first example embodiment. The data processing apparatus 200 includes, as its components, a processing performing unit 210, a sanitizable signature processing unit 220, a range proof selecting unit 230, and a transmitting unit 240. The processing performing unit 210 functions as processing performing means. The sanitizable signature processing unit 220 functions as sanitizable signature processing means. The range proof selecting unit 230 functions as range proof selecting means. The transmitting unit 240 functions as transmitting means (second transmitting means).

The data processing apparatus 200 acquires (receives) information including the data set, the sanitizable signature, the range proof data, and the digital signature from the data providing apparatus 100. Then, the data processing apparatus 200 processes at least one of a plurality of data included in the data set provided from the data providing apparatus 100. Note that the data processing apparatus 200 may also function as an anonymizing apparatus that anonymizes data (anonymizing processing).

The data processing apparatus 200 may be implemented by, for example, an information processing apparatus such as a computer. That is, the data processing apparatus 200 includes an arithmetic apparatus such as a CPU (Central Processing Unit) and a storage device such as a memory or a disk. The data processing apparatus 200 implements each of the above-described components by, for example, having the arithmetic apparatus execute a program stored in the storage device. This feature also applies to other example embodiments described later.

The processing performing unit 210 performs a process for performing generalizing processing (anonymization) for the processing-target data. A specific process performed by the processing performing unit 210 will be described later. The sanitizable signature processing unit 220 performs a process for the sanitizable signature generated for the processing-target data by the data providing apparatus 100 by using the not-yet-processed processing-target data (i.e., the processing-target data that has not been processed yet) and the already-processed processing-target data (i.e., the processing-target data that has already been processed). A specific process performed by the sanitizable signature processing unit 220 will be described later.

The range proof selecting unit 230 selects, for each of the processing-target data that have been subjected to the generalizing processing, range proof data corresponding to the range of the generalized attribute value from among the plurality of the range proof data. A specific process performed by the range proof selecting unit 230 will be described later. The transmitting unit 240 transmits the data set of which the processing-target data have already been processed, the processed sanitizable signature, the range proof data selected for the respective processing-target data, and the digital signatures corresponding to the range proof data to the data receiving apparatus 300. A specific process performed by the transmitting unit 240 will be described later. Note that the data processing apparatus 200 may temporarily store therein the information to be transmitted before transmitting the information to the data receiving apparatus 300.

Figure 5:
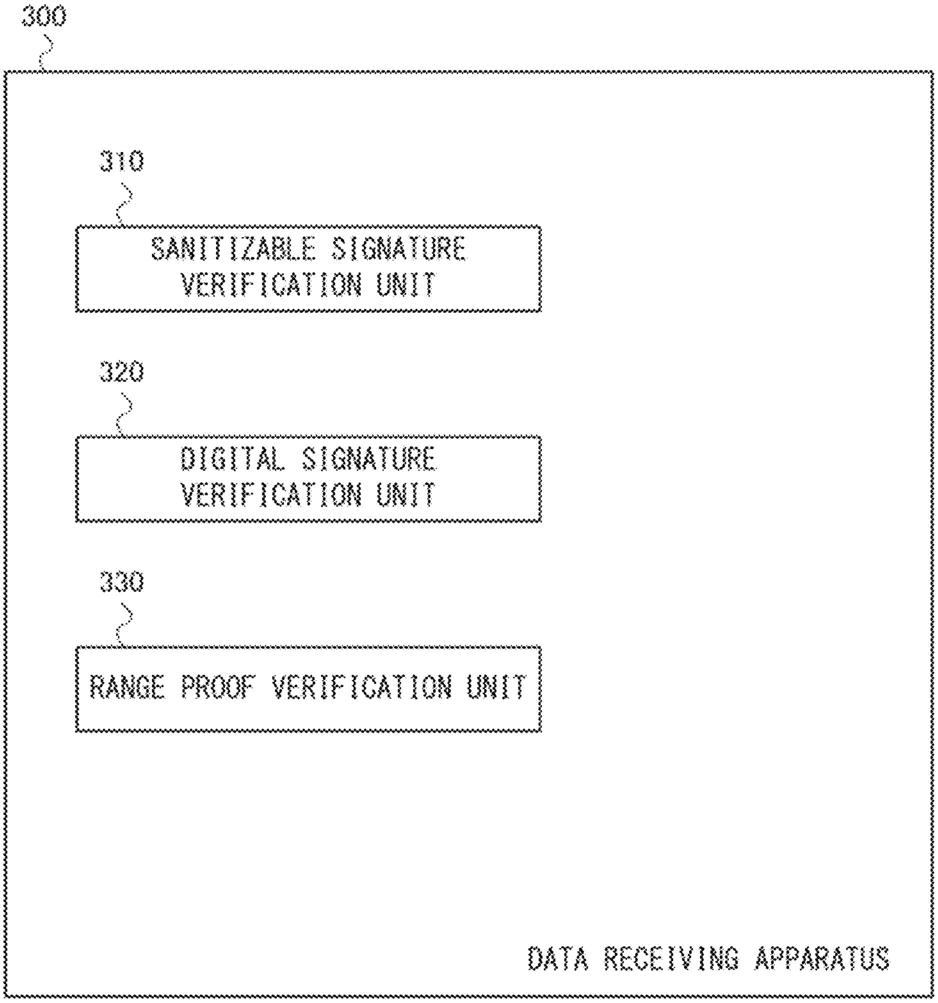
FIG. 5 shows a configuration of a data receiving apparatus according to the first example embodiment.

FIG. 5 shows a configuration of the data receiving apparatus 300 according to the first example embodiment. The data receiving apparatus 300 includes, as its components, a sanitizable signature verification unit 310, a digital signature verification unit 320, and a range proof verification unit 330. The sanitizable signature verification unit 310 functions as sanitizable signature verification means (first verification means). The digital signature verification unit 320 functions as digital signature verification means (second verification means: range proof signature verification means). The range proof verification unit 330 functions as range proof verification means (third verification means).

The data receiving apparatus 300 acquires (receives) the processed data set, the processed sanitizable signature, the selected range proof data, and the digital signatures corresponding to the range proof data from the data processing apparatus 200. Then, the data receiving apparatus 300 verifies the signature for the data set of which at least the part of data has been processed. Note that the data receiving apparatus 300 can also function as a signature verification apparatus (verification apparatus) that verifies a signature.

The data receiving apparatus 300 may be implemented by, for example, an information processing apparatus such as a computer. That is, the data receiving apparatus 300 includes an arithmetic apparatus such as a CPU (Central Processing Unit) and a storage device such as a memory or a disk. The data receiving apparatus 300 implements each of the above-described components by, for example, having the arithmetic apparatus execute a program stored in the storage device. This feature also applies to other example embodiments described later.

The sanitizable signature verification unit 310 verifies the data set of which the processing-target data have already been processed and the sanitizable signature processed by the data processing apparatus 200. A specific process performed by the sanitizable signature verification unit 310 will be described later. The digital signature verification unit 320 verifies the digital signature corresponding to the range proof data selected by the data processing apparatus 200 among the plurality of range proof data acquired by the data providing apparatus 100. A specific process performed by the digital signature verification unit 320 will be described later. The range proof verification unit 330 verifies the range proof data selected by the data processing apparatus 200. A specific process performed by the range proof verification unit 330 will be described later.

As described above, in the information processing system 10 according to the first example embodiment, the data providing apparatus 100 is configured to acquire a plurality of range proof data each of which is data for proving that the not-yet-processed attribute value falls within the range of the generalized attribute value. Further, the data processing apparatus 200 is configured to select range proof data corresponding to the range of the generalized attribute value. In this way, unlike Patent Literature 1, the data provider or the like does not need to designate a rule for abstraction (generalization). Further, by performing (e.g., generating) a sanitizable signature with which it is possible to perform arbitrary generalizing processing, satisfactory data processing flexibility can be achieved. Further, even when a sanitizable signature is performed (e.g., generated), it is possible to verify, in the data receiving apparatus 300, whether or not the original data has appropriately been generalized. Therefore, in the first example embodiment, data can be appropriately processed.

Further, as described above, if it is attempted to achieve satisfactory processing flexibility in Patent Literature 1, the number of patterns for abstraction increases. As a result, since the calculation of a hash value increases according to the number of patterns, the calculation load may increase. In contrast, in the first example embodiment, the increase in the calculation load, which would otherwise increase according to the number of patterns for the generalizing processing, is suppressed. Therefore, in the first example embodiment, the processing can be efficiently performed. Therefore, the information processing system 10 according to the first example embodiment can appropriately process data while efficiently performing the process.

Note that the range proof acquisition unit 130 may generate range proof data for each of a plurality of candidates (range candidates) for the range in which the attribute value of the processing-target data is included (i.e., the range within which the attribute value of the processing-target data falls). In this case, the range proof selecting unit 230 may select range proof data for the candidate (range candidate) corresponding to the range of the generalized attribute value from among the plurality of generated range proof data. Details of these features will be described later.

Further, the signature generation unit 140 may also generate a digital signature for a first set (candidate/proof set) which is a set of the above-described candidate (range candidate) and range proof data corresponding to this candidate. In this case, the transmitting unit 150 may transmit the first set and a digital signature corresponding to this first set to the data processing apparatus 200. Further, the range proof selecting unit 230 may select at least one first set corresponding to the range of the generalized attribute value from among a plurality of first sets. Further, the transmitting unit 240 may transmit the selected first set and a digital signature corresponding to the selected first set to the data receiving apparatus 300. Further, the digital signature verification unit 320 may verify the first set and the digital signature corresponding to this first set. Then, the range proof verification unit 330 may verify the range proof data by using the first set. Details of these features will be described later. Further, the first set may include identification information of the processing-target data corresponding thereto. Details of these features will be described later.

When there is a first set including a range candidate which coincides with the range of the generalized attribute value, the range proof selecting unit 230 may select this first set. On the other hand, when there is no first set including a range candidate which coincides with the range of the generalized attribute value, the range proof selecting unit 230 may select a second set (range proof set) which is a combination of a plurality of first sets. That is, when the range of the generalized attribute value is expressed by a combination of a plurality of candidates, the range proof selecting unit 230 may select a second set which is a combination of first sets corresponding to the plurality of candidates. Further, the transmitting unit 240 may transmit the selected second set and a digital signature corresponding to the selected second set to the data receiving apparatus. Further, the digital signature verification unit 320 may verify the selected second set and a digital signature corresponding to this second set. Then, the range proof verification unit 330 may verify the range proof data by using the selected second set. Details of these features will be described later.

Further, the range proof acquisition unit 130 may generate range proof data by using a proof protocol based on zero-knowledge proof. In this case, the range proof verification unit 330 may verify the range proof data by using the proof protocol based on the zero-knowledge proof. Further, the range proof acquisition unit 130 may generate range proof data by using a proof protocol based on non-interactive zero-knowledge proof. In this case, the range proof verification unit 330 may verify the range proof data by using the proof protocol based on the non-interactive zero-knowledge verification. Details of these features will be described later.

Second Example Embodiment

Next, a second example embodiment will be described. In order to clarify the explanation, the following descriptions and drawings are omitted and simplified as appropriate. Further, the same elements are assigned the same reference numerals (or symbols) throughout the drawings, and redundant descriptions thereof are omitted as appropriate. Note that the configuration of a system according to the second example embodiment is substantially the same as that of the system according to the first example embodiment, and therefore descriptions thereof will be omitted. That is, the information processing system 10 according to the second example embodiment includes a data providing apparatus 100, a data processing apparatus 200, and a data receiving apparatus 300. The second example embodiment corresponds to a more detailed configuration of the above-described first example embodiment.

Figure 6:
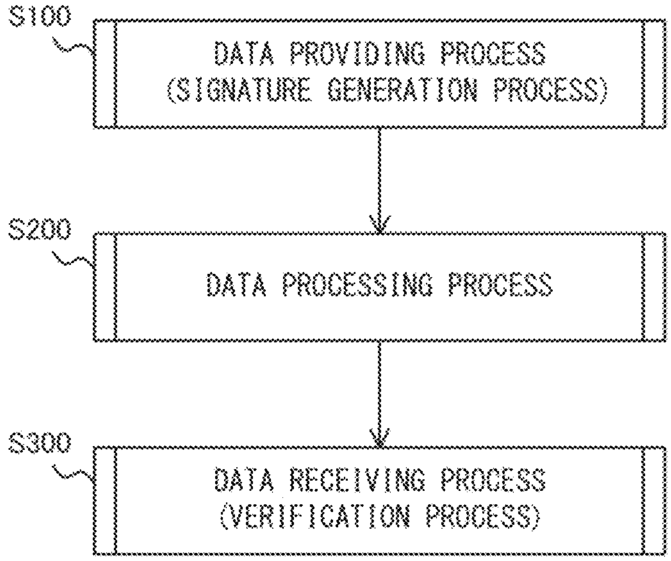
FIG. 6 is a flowchart showing an information processing method performed by an information processing system according to a second example embodiment.

FIG. 6 is a flowchart showing an information processing method performed by an information processing system 10 according to the second example embodiment. The information processing method performed by the information processing system 10 can also be implemented as a digital signature method (a signature method or an electronic signature method), a data processing system, or a signature verification method (a verification method).

The information processing system 10 performs a data providing process (Step S100). Specifically, the data providing apparatus 100 of the information processing system 10 provides a data set composed of a plurality of data about at least one attribute. Note that the data providing apparatus 100 performs a signature generation process for the provided data (data set) as described above. Details of the process in the step S100 will be described later.

The information processing system 10 performs a data processing process (Step S200). Specifically, the data processing apparatus 200 of the information processing system 10 acquires information containing a data set, a sanitizable signature, and a digital signature (range proof signature) from the data providing apparatus 100. Then, the data processing apparatus 200 processes at least one of a plurality of data included in the data set. Details of the process in the step S200 will be described later.

The information processing system 10 performs a data receiving process (Step S300). Specifically, the data receiving apparatus 300 of the information processing system 10 acquires the data set of which at least one data has been processed, the sanitizable signature, and the digital signature (range proof signature) from the data processing apparatus 200. Then, the data receiving apparatus 300 performs a verification process. Details of the process in the step S300 will be described later.

<Signature Generation Process>

Figure 7:
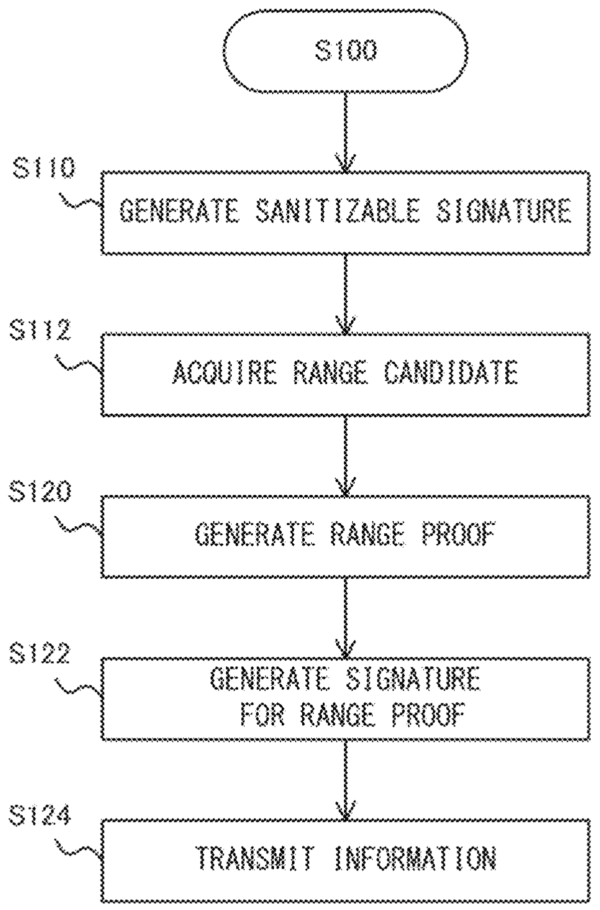
FIG. 7 is a flowchart showing a data providing process performed by a data providing apparatus according to the second example embodiment.

FIG. 7 is a flowchart showing a data providing process (S100) performed by the data providing apparatus 100 according to the second example embodiment. Although the flowchart shown in FIG. 7 shows the data providing method, it can also be considered that it shows a digital signature method (a signature method or an electronic signature method).

In the data providing apparatus 100, the sanitizable signature generation unit 120 generates a sanitizable signature (Step S110). Specifically, the sanitizable signature generation unit 120 generates a sanitizable signature for a data set (plaintext) which is the original data. More specifically, as described above, the sanitizable signature generation unit 120 may generate a sanitizable signature with which it is possible to perform arbitrary generalizing processing for processing-target data (cell) that is permitted to be processed. Meanwhile, the sanitizable signature generation unit 120 may generate a signature with which it is impossible to perform processing for data (cells) that is not permitted to be processed. In this case, the sanitizable signature generation unit 120 may generate a signature (sanitizable signature) by an RSA signature method or a DSA (Digital Signature Algorithm) signature method by using a hash value generated for the data and a private key.

FIG. 8 shows a table for explaining a data set Da1 according to the second example embodiment. The data set Da1 shown in FIG. 8 is formed in a table format with M rows and N columns. Here, it is assumed that the column for the Attribute #1 is a column that is not to be processed. Meanwhile, it is assumed that the column for the Attribute #2 is a column to be processed (generalized). In this case, the sanitizable signature generation unit 120 may generate, for each of the data (Attribute values #11 to #M1) of the Attribute #1, a signature with which it is impossible to perform processing for the data. Meanwhile, the sanitizable signature generation unit 120 may generate, for each of the data (Attribute values #12 to #M2) of the Attribute #2, a sanitizable signature with which it is possible to perform generalizing processing for the data. The sanitizable signature can be implemented (e.g., generated) by an arbitrary signature algorithm by which it is possible to perform generalizing processing. For example, the sanitizable signature generation unit 120 may generate a sanitizable signature by using a private key for an ordinary signature, a public key for the sanitizable signature, a plaintext (processing-target data), and a random number.

Further, for example, the sanitizable signature generation unit 120 may generate a sanitizable signature by applying a signature algorithm in which a chameleon hash and a digital signature are combined with each other (chameleon hash-based sanitizable signature) as disclosed in Non-patent Literature 1. For example, the sanitizable signature generation unit 120 may calculate a hash value (message digest) for each row by using an ordinary hash function (such as SHA 256) for an attribute value (e.g., Attribute value #11 or the like) in a column (attribute) that is not to be processed. Further, the sanitizable signature generation unit 120 may calculate, for each row, a hash value for an attribute value (e.g., Attribute value #12 or the like) in a column (attribute) to be processed by a chameleon hash function by using a public key for the sanitizable signature.

In this case, the sanitizable signature generation unit 120 may generate (h, r) by using a function hash1(pk, m). Note that the function hash1( ) is a chameleon hash function: pk is a public key for a chameleon hash-based sanitizable signature; and m is a plaintext (not-yet-processed processing-target data). Further, h is a hash value, and r is a random number corresponding to h.

Further, the sanitizable signature generation unit 120 may calculate a hash value for a data sequence (data series, data string, data stream) obtained by concatenating hash values for attribute values of respective attributes calculated for respective rows. That is, the sanitizable signature generation unit 120 may calculate a hash value for a data sequence obtained by concatenating a hash value(s) for an attribute value(s) of an attribute(s) to be processed and a hash value(s) for an attribute value(s) of an attribute(s) not to be processed. Then, the sanitizable signature generation unit 120 may generate, for the calculated hash value, a sanitizable signature (data set signature) for the data set by using a private key for signature generation.

The range proof acquisition unit 130 acquires range candidates (Step S112). Specifically, the range proof acquisition unit 130 acquires a plurality of candidates (range candidates) for a range in which the attribute value of the processing-target data is included. The range candidates may be generated by the range proof acquisition unit 130, or generated by other apparatuses and acquired (received) therefrom. Further, the range candidates may be arbitrarily determined by the user (data provider).

It is assumed that an attribute value x of an attribute a (corresponding to a respective column of the data set Da1) of a record r (corresponding to a respective row of the data set Da1) is one that is to be subjected to generalizing processing. Note that r and a correspond to identification information of the processing-target data. In this case, the range proof acquisition unit 130 acquires range candidates $R_1$ . . . , and $R_n$ in each of which the attribute value x is included (i.e., within which the attribute value x falls). In other words, each of the range candidates $R_1$ . . . , and $R_n$ includes the attribute value x. Further, the range proof acquisition unit 130 acquires range candidates for each of all attribute values of each of all attributes that are to be subjected to generalizing processing.

In the example shown in FIG. 8, as a first specific example, the range proof acquisition unit 130 acquires range candidates in each of which an Attribute value #12 is included. For example, when an Attribute #2 is "Age" and an Attribute 5 value #12 is "21" (x=21), the range proof acquisition unit 130 may acquire the following $R_1$ to $R_4$ for the Attribute value #12.

$R_1$: $20 \le x \le 29$ (e.g., meaning "twenties")

$R_2$: $20 \le x \le 40$ (e.g., meaning a "young person")

$R_3$: $20 \le x \le 100$ (e.g., meaning an "adult")

$R_4$: $19 \le x \le 22$ (e.g., meaning a "college student")

Further, as a second specific example, it is assumed that: an Attribute #3 is a column to be processed; an Attribute #3 is "Address"; and an Attribute value #13 is "Tokyo" (x="Tokyo"). In this case, the range proof acquisition unit 130 may acquire the following $R_1$ to $R_4$ for the Attribute value #13.

$R_1$: "Kanto"

$R_2$: "South Kanto"

$R_3$: "East Japan"

$R_4$: "Japan"

The range proof acquisition unit 130 generates a range proof (Step S120). Specifically, the range proof acquisition unit 130 generates, for each attribute value to be subjected to generalizing processing, range proof data σ (i.e., plurality of pieces of range proof data σ) corresponding to a plurality of acquired range candidates $R_1$, . . . , and $R_n$, respectively. Note that range proof data $\sigma_i$ corresponding to a range candidate $R_i$ is data (some value) based on which it is possible to verify, by using the range proof data $\sigma_i$, that the attribute value x is included in (i.e., falls within) the range candidate $R_i$ even when the data verifier 30 does not know the attribute value x.

For example, the range proof acquisition unit 130 generates range proof data $\sigma_i$ corresponding to a range candidate $R_i$ (i=1, . . . , n) for the attribute value x by the below-shown Expression (1).

[Expression 1]

$$\sigma_i \leftarrow Gen(x, R_i, pp)(\text{for } i = 1, \ldots, n) \quad (1)$$

In Expression (1), pp is a public parameter (parameter that can be laid open to the public). Further, Gen( ) is a function of outputting range proof data $\sigma_i$ which proves that x is included in $R_i$. The function Gen( ) is a function that uses pp, x, and $R_i$ as inputs, and outputs $\sigma_i$. Gen( ) can be a function in an arbitrary proof protocol. Note that the function Gen( ) can be determined as appropriate according to the algorithm of the proof protocol to be applied.

For example, Gen( ) may be a function in a proof protocol based on arbitrary zero-knowledge proof. In this case, the range proof acquisition unit 130 generates range proof data σ by using the proof protocol based on the zero-knowledge proof. Alternatively, the Gen( ) may be a function in a proof protocol based on arbitrary zero-knowledge interactive proof (ZKIP: Zero-Knowledge Interactive Proof). In this case, the range proof acquisition unit 130 generates range proof data σ by using the proof protocol based on the zero-knowledge interactive proof. For example, an algorithm disclosed in Non-patent Literature 2 may be used as the proof protocol based on the zero-knowledge interactive proof.

Further, Gen( ) may be a function in a proof protocol based on arbitrary non-interactive zero-knowledge proof (NIZK: Non-Interactive Zero-Knowledge proof). In this case, the range proof acquisition unit 130 generates range proof data σ by using the proof protocol based on the non-interactive zero-knowledge proof. For example, CFT proof, Boudot proof, or the like disclosed in Non-patent Literature 3, or an algorithm such as Bulletproof may be used as the proof protocol based on the non-interactive zero-knowledge proof. Further, Gen( ) may also be a function in an arbitrary proof protocol other than the zero-knowledge proof. In this case, the range proof acquisition unit 130 generates range proof data σ by using a proof protocol other than the zero-knowledge proof. For example, an argument, which is a proof system based on computational soundness, may be used as a proof protocol other than the zero-knowledge proof.

FIG. 9 shows an example of a non-interactive zero-knowledge proof algorithm used for generating range proof data by the range proof acquisition unit 130 according to the second example embodiment. Note that FIG. 9 is merely an example, and the algorithm used for generating a range proof is not limited to the example shown in FIG. 9. FIG. 9 shows an algorithm based on the above-described CFT proof. FIG. 9 shows a non-interactive zero-knowledge proof that a given value x falls within a range expressed as $-2^{t+1}b \le x \le 2^{t+1}b$. FIG. 9 shows an algorithm by which Alice can allows (i.e., enables) Bob to verify that x falls within a range expressed as $-2^{t+1}b \le x \le 2^{t+1}b$ just by sending a proof to Bob without informing Bob of x. Note that: t, 1, and s are security parameters: n is a large composite number (which is difficult to factorize); and H is a hash function of outputting 2t-bit. In FIG. 9, the function Gen( ) corresponds to an algorithm by which Alice calculates (C, $D_1$, $D_2$) in steps 1 to 3. Further, the calculated data (C, $D_1$, $D_2$) corresponds to range proof data σ.

The signature generation unit 140 generates a signature for the range proof data (Step S122). Specifically, the signature generation unit 140 generates a digital signature (range proof signature) for a candidate/proof set (first set) which is a set of the range candidate $R_i$ and the range proof data $\sigma_i$ for the range candidate $R_i$. More specifically, the signature generation unit 140 may generate a digital signature for a candidate/proof set including identification information of the processing-target data. That is, the signature generation unit 140 generates a digital signature δ_(r, a, $R_i$, $\sigma_i$) for a candidate/proof set (r, a, $R_i$, $\sigma_i$), which is a set of r, a, a range candidate $R_i$ for processing-target data (r, a), and range proof data $\sigma_i$. As a result, a digital signature, which indicates that a proof (range proof data $\sigma_i$) as to which attribute of which record falls within a range candidate $R_i$ has certainly been generated by the data provider (data providing apparatus 100), is generated.

Note that the signature generation unit 140 may generate a digital signature (range proof signature) by an ordinary signature algorithm other than the sanitizable signature. For example, the signature generation unit 140 may generate a digital signature by using a hash value, which is generated for the candidate/proof set (r, a, $R_i$, $\sigma_i$) by an RSA signature method or a DSA (Digital Signature Algorithm) signature method, and a private key. That is, the signature generation unit 140 may calculate, for example, a hash value for concatenated data ($r\|a\|R_i|\sigma_i$) of the candidate/proof set (r, a, $R_i$, $\sigma_i$) by using an ordinary hash function. Then, the signature generation unit 140 may generate a digital signature δ_(r, a, $R_i$, $\sigma_i$) for the calculated hash value by using a private key.

Note that the signature generation unit 140 generates a digital signature δ_(r, a, $R_i$, $\sigma_i$) for each i of each (r, a). For example, in the example shown in FIG. 8, the signature generation unit 140 generates δ_(1, 2, $R_1$, $\sigma_1$), δ_(1, 2, $R_2$, $\sigma_2$), . . . , and δ_(1, 2, $R_n$, $\sigma_n$) for the Attribute value #12. Similarly, the signature generation unit 140 generates δ_(2, 2, $R_1$, $\sigma_1$), δ_(2, 2, $R_2$, $\sigma_2$), . . . , and δ_(2, 2, $R_n$, $\sigma_n$) for the Attribute value #22.

That is, the signature generation unit 140 generates a set of pairs each consisting of a candidate/proof set and a digital signature corresponding thereto for each cell (processing-target data) of the attribute to be processed as shown by the below-shown Expression (2).

[Expression 2]

$$\left\{(r, a, R_i, \sigma_i), \delta_{(r,a,R_i,\sigma_i)}\right\}_{i=1;a;r}^{n;C_{j'};row_{max}} \quad (2)$$

In Expression (2), $C_{j'}$ corresponds to the last column among the columns corresponding to the attributes to be subjected to generalizing processing. In the example shown in FIG. 8, when an attribute #N is an attribute to be processed, $C_{j'}$ corresponds to the attribute #N. Further, $row_{max}$ corresponds to a record in the last row of the data set. In the example shown in FIG. 8, $row_{max}$ corresponds to the row #M.

Note that the signature generation unit 140 generates a digital signature δ_(r, a, $R_i$, $\sigma_i$) separately from the above-described sanitizable signature process performed by the sanitizable signature generation unit 120. This is because, by doing so, it is possible to select a range proof set (second set), which is a combination of a plurality of candidate/proof sets, in a process performed by the data processing apparatus 200 described later. That is, when a sanitizable signature is generated, a hash value is calculated for a hash value calculated by an ordinary hash function or a chameleon hash function and a hash value calculated for the candidate/proof set, and a signature is generated for the calculated hash value. As a result, a range proof set (a plurality of range proof data) cannot be selected in the data processing apparatus 200. Therefore, the signature generation unit 140 generates a digital signature δ_(r, a, $R_i$, $\sigma_i$) separately from the sanitizable signature process.

The transmitting unit 150 transmits information to the data processing apparatus 200 (Step S124). Specifically, the transmitting unit 150 transmits the data set Da1, the sanitizable signature (data set signature), the candidate/proof set, and the digital signature (range proof signature). Note that the transmitting unit 150 may transmit a set {(r, a, $R_i$, $\sigma_i$), δ_(r, a, $R_i$, $\sigma_i$)} of pairs each consisting of a candidate/proof set and a range proof signature to the data processing apparatus 200. Note that the data providing apparatus 100 may temporarily store therein the information to be transmitted before transmitting the information to the data processing apparatus 200.

<Data Processing Process>

Figure 10:
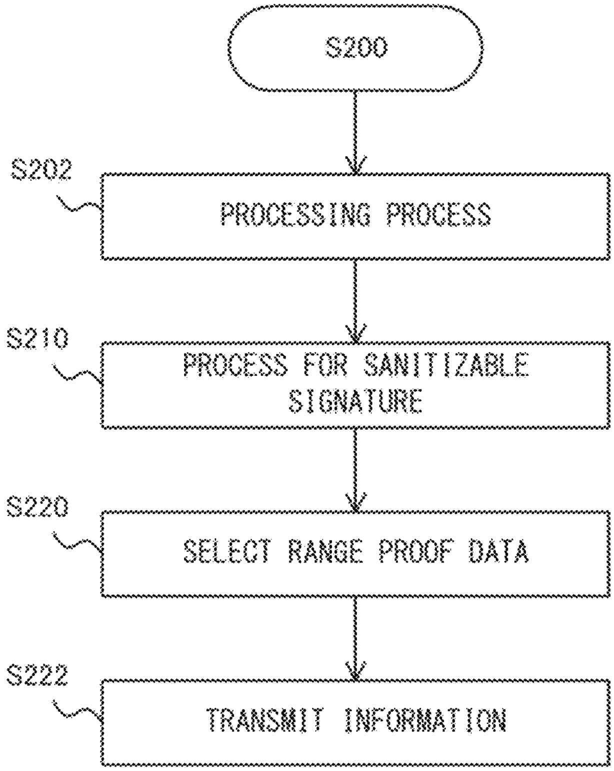
FIG. 10 is a flowchart showing a data processing process performed by a data processing apparatus according to the second example embodiment.

FIG. 10 is a flowchart showing a data processing process (S200) performed by the data processing apparatus 200 according to the second example embodiment. FIG. 10 shows a data processing method. In the data processing apparatus 200, the processing performing unit 210 performs a process for performing generalizing processing (anonymization) for processing-target data corresponding to an attribute to be processed (Step S202). The processing performing unit 210 may perform generalizing processing for each attribute value in a column of an attribute to be to be subjected to generalizing processing through an operation performed by the data processing entity.

Similarly to the above-described first specific example shown in FIG. 8, it is assumed that an Attribute #2 is "Age" and an Attribute value #12 is "21". Further, it is assumed that the data processing entity generalizes the Attribute value #12="21" to "Twenties (20 to 29 years old)". In this case, the processing performing unit 210 changes (processes) the Attribute value #12 to a value indicating "Twenties (20 to 29 years old)". Alternatively, for example, when the data processing entity generalizes the Attribute value #12="21" to "20 to 22 years old", the processing performing unit 210 changes (processes) the Attribute value #12 to a value indicating "20 to 22 years old".

Further, similarly to the above-described second specific example shown in FIG. 8, an Attribute #3 is a column to be processed: an Attribute #3 is "Address"; and an Attribute value #13 is "Tokyo". Further, it is assumed that the data processing entity generalizes the Attribute value #13="Tokyo" to "Kanto". In this case, the processing performing unit 210 changes (processes) the Attribute value #13 to a value indicating "Kanto". Alternatively, for example, the data processing entity generalizes the Attribute value #13="Tokyo" to "Japan". In this case, the processing performing unit 210 changes (processes) the Attribute value #13 to a value indicating "Japan".

As described above, the processing performing unit 210 changes (processes) an attribute value x of an attribute a of a record r to an attribute value x'. Further, a range corresponding to this already-processed attribute value x' is set to R'. In the above-described example, when the Attribute value #12="21" is generalized to "Twenties (20 to 29 years old)", x is equal to 21 (x=21), and x' is a value indicating "Twenties (20 to 29 years old)". Further, the range R' corresponding to x' is expressed as "20≤x≤29". Further, when the Attribute value #12="21" is generalized to "20 to 22 years old", x is equal to 21 (x=21) and x' is a value indicating "20 to 22 years old". Further, the range R' corresponding to x' is expressed as "20≤x≤22".

The sanitizable signature processing unit 220 performs a process for the sanitizable signature (Step S210). Specifically, as described above, the sanitizable signature processing unit 220 performs a process for the sanitizable signature by using the not-yet-processed processing-target data and the already-processed processing-target data. More specifically, the sanitizable signature processing unit 220 may process the sanitizable signature by using the not-yet-processed processing-target data, the already-processed processing-target data, the sanitizable signature generated by the data providing apparatus 100, a public key for an ordinary signature, and a private key corresponding to a public key for the sanitizable signature. In this way, even when the processing-target data is processed, the validity of the signature can be maintained. That is, the sanitizable signature processing unit 220 processes the sanitizable signature so that the verification succeeds when the sanitizable signature is verified by the data recipient (data receiving apparatus 300).

Further, for example, when the sanitizable signature is generated by a chameleon hash-based sanitizable signature, the sanitizable signature processing unit 220 may perform processing for the sanitizable signature by using a private key corresponding to a public key that is used when the sanitizable signature is generated. By using the private key, the sanitizable signature processing unit 220 can obtain, for the already-processed processing-target data (attribute value), a collision with a hash value calculated for the not-yet-processed processing-target data (attribute value). In this way, the data processing apparatus 200 can process the processing-target data while maintaining the validity of the signature.

In this case, the sanitizable signature processing unit 220 may generate a random number r' by a function adopt (sk, m, m', r). Note that sk is a private key corresponding to a public key pk that is used when the sanitizable signature is generated by the chameleon hash-based sanitizable signature. Further, m' is the already-processed data (attribute value). Further, r' is a random number corresponding to m'. Note that a relation h=hash2(pk, m, r)=hash2(pk, m', r') holds. Note that hash2( ) will be described later.

The range proof selecting unit 230 selects, for each of the processing-target data that have been subjected to the generalizing processing, range proof data corresponding to the range of the generalized attribute value (Step S220). Specifically, the range proof selecting unit 230 first acquires the set $\{(r, a, R_i, \sigma_i), \delta\_(r, a, R_i, \sigma_i)\}$ of pairs each consisting of a candidate/proof set and a range proof signature received from the data providing apparatus 100.

The range proof selecting unit 230 determines whether or not there is a candidate/proof set $(r, a, R_{i'}, \sigma_{i'})$ including a range candidate R which coincides with a range R' $(=R_{i'})$ corresponding to the already-processed attribute value x' among the candidate/proof sets $(r, a, R_i, \sigma_i)$ for the record r and the attribute a. When there is a candidate/proof set $(r, a, R_{i'}, \sigma_{i'})$ including a range candidate R which coincides with the range R', i.e., when there is $R_{i'}$ equal to R' $(R'=R_{i'})$, the range proof selecting unit 230 selects this candidate/proof set $(r, a, R_{i'}, \sigma_{i'})$. In this way, the range proof $\sigma_i'$ is selected. Further, the range proof selecting unit 230 selects (extracts) a digital signature (range proof signature) corresponding to the selected candidate/proof set.

Similarly to the above-described first specific example, it is assumed that when the Attribute #2 is "Age" and the Attribute value #12 is "21", ranges $R_1$: 20≤x≤29, $R_2$: 20≤x≤40, $R_3$: 20≤x≤100, and $R_4$: 19≤x≤22 have already been acquired. Further, it is assumed that the Attribute value #12="21" has been generalized to "20 to 29 years old". In this case, R' corresponding to the already-processed attribute value x' is expressed as "20≤x≤29". Therefore, R' is equal to $R_1$ $(R'=R_1)$ for the Attribute value #12. Therefore, the range proof selecting unit 230 selects a candidate/proof set $(r, a, R_{i'}, \sigma_{i'})$ $(=(1, 2, R_1, \sigma_1))$ corresponding to the range candidate $R_1$ for the Attribute value #12. Then, the range proof selecting unit 230 selects (extracts) a range proof signature $\delta\_(1, 2, R_1, \sigma_1)$ corresponding to the selected candidate/proof set $(1, 2, R_1, \sigma_1)$.

On the other hand, when there is no candidate/proof set $(r, a, R_{i'}, \sigma_{i'})$ including a range candidate R which coincides with the range R', the range proof selecting unit 230 determines whether or not the range R' is expressed by a combination of a plurality of range candidates included in the plurality of candidate/proof sets. For example, the range proof selecting unit 230 determines whether or not there is a set $\{R_{i'}\}$ of $R_i$ and $R_j$ that satisfies a relation $R'=R_i \cap R_j$. In this case, R' can be expressed by a combination of $R_i$ and $R_j$.

When the range R' is expressed by a combination of a plurality of range candidates, the range proof selecting unit 230 selects a combination of candidate/proof sets corresponding to these plurality of range candidates (i.e., selects a second set: a range proof set). That is, when there is a set $\{R_{i'}\}$ of $R_i$ and $R_j$ that satisfy a relation $R'=R_i \cap R_j$, the range proof selecting unit 230 selects a set $\{(r, a, R_{i'}, \sigma_{i'})\}=\{(r, a, R_i, \sigma_i), (r, a, R_j, \sigma_j)\}$ of $(r, a, R_{i'}, \sigma_{i'})$ corresponding to $R_i$ and $R_j$. In this way, a plurality of range proofs $\sigma_{i'}$ are selected. Further, the range proof selecting unit 230 selects (extracts) a digital signature (range proof signature) corresponding to the selected candidate/proof set. Note that the number of candidate/proof sets selected for a given range R' is not necessarily two, but may be three or more.

Similarly to the above-described first specific example, it is assumed that when the Attribute #2 is "Age" and the Attribute value #12 is "21", ranges $R_1$: 20≤x≤29, $R_2$: 20≤x≤40, $R_3$: 20≤x≤100, and $R_4$: 19≤x≤22 have already been acquired. Further, it is assumed that the Attribute value #12="21" has been generalized to "20 to 22 years old". In this case, R' corresponding to the already-processed attribute value x' is expressed as "20≤x≤22". In this case, R' is expressed, for example, as $R_1 \cap R_4$. Therefore, the range proof selecting unit 230 selects a set of candidate/proof sets $\{(r, a, R_i, \sigma_{i'})\}$ $(=\{(1, 2, R_1, \sigma_1), (1, 2, R_4, \sigma_4)\}$ corresponding to the range candidate $R_1$ and the range candidate $R_4$ for the Attribute value #12. Then, the range proof selecting unit 230 selects (extracts) range proof signatures $\delta\_(1, 2, R_1, \sigma_1)$ and $\delta\_(1, 2, R_4, \sigma_4)$ corresponding to the selected candidate/proof sets $(1, 2, R_1, \sigma_1)$ and $(1, 2, R_4, \sigma_4)$.

The transmitting unit 240 transmits information to the data receiving apparatus 300 (Step S222). Specifically, the transmitting unit 240 transmits the data set of which the processing-target data have already been processed and the processed sanitizable signature to the data receiving apparatus 300. Further, the transmitting unit 240 transmits the candidate/proof sets selected for respective processing-target data, and the digital signatures (range proof signatures) corresponding to the selected candidate/proof sets. Note that the data processing apparatus 200 may temporarily store therein the information to be transmitted before transmitting the information to the data receiving apparatus 300.

Note that the transmitting unit 240 may transmit a set {(r, a, $R_i$, $\sigma_i$), δ_(r, a, $R_i$, $\sigma_i$)} of pairs each consisting of a candidate/proof set and a range proof signature to the data processing apparatus 200 for each processing-target data (r, a). Note that the set {(r, a, $R_i$, $\sigma_i$), δ_(r, a, $R_i$, $\sigma_i$)} of pairs each consisting of a candidate/proof set and a range proof signature corresponds to the range proof set. Further, the transmitting unit 240 may transmit the set of pairs each consisting of a candidate/proof set and a range proof signature for respective processing-target data (r, a) to the data processing apparatus 200 as shown by the below-shown Expression (3).

[Expression 3]

$$\{\{(r, a, R_i, \sigma_i), \delta_{(r,a,R_i,\sigma_i)}\}\}_{r,a} \quad (3)$$

Note that in this example embodiment, the range proof selecting unit 230 "selects" the range candidate $R_i$ corresponding to the range R', and the range proof $\sigma_i$ and the range proof signature δ corresponding thereto. In contrast, in the technology disclosed in Patent Literature 1, a value of a substitution candidate for target data is added to the target data in advance, and then it is replaced with a hash value obtained by hashing, which is an intermediate process in the signature generation process. That is, in Patent Literature 1, a new hash value is generated from a hash value. In such a technology, when data is processed, it is necessary to calculate a hash value according to the number of substitution candidates, i.e., the number of abstraction patterns. Therefore, as the number of abstraction patterns increases, the amount of the calculation of a hash value increases, so that the processing load may increase. In particular, it is necessary to increase the number of abstraction patterns in order to improve the flexibility of processing. Therefore, if it is attempted to achieve satisfactory processing flexibility, the processing load may increase. Therefore, in the technology in Patent Literature 1, there is a possibility that if it is attempted to achieve satisfactory processing flexibility, the processing cannot be efficiently performed.

In contrast, in this example embodiment, the information processing system or the like is configured so that the data provider acquires a plurality of range proof data each of which is data for proving that the not-yet-processed attribute value falls within the range of the generalized attribute value. Further, the system according to this example embodiment is configured so that the data processing entity selects range proof data corresponding to the range of the generalized attribute value. Therefore, in this example embodiment, when data is processed, all that needs to be done is to "select" a range candidate $R_i$ corresponding to a range R', and a range proof $\sigma_i$ and a range proof signature δ corresponding thereto, so that the processing load does not increase even when the number of range candidates increases. Therefore, in this example embodiment, it is possible to efficiently perform a process while achieving satisfactory processing flexibility.

<Verification Process>

Figure 11:
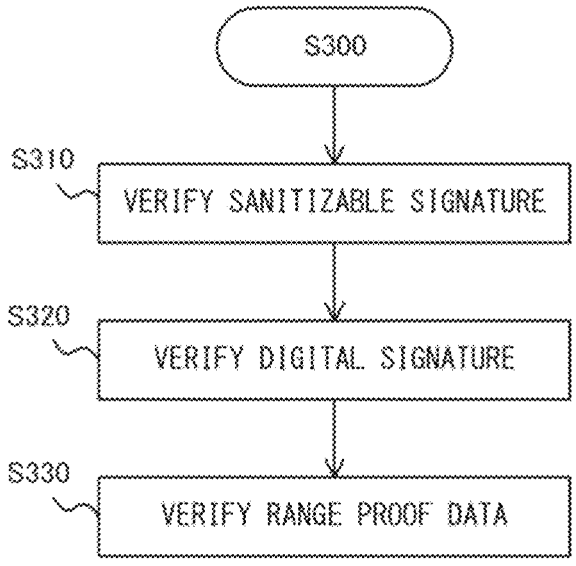
FIG. 11 is a flowchart showing a data receiving process performed by a data receiving apparatus according to the second example embodiment.

FIG. 11 is a flowchart showing a data receiving process (S300) performed by the data receiving apparatus 300 according to the second example embodiment. Although the flowchart shown in FIG. 11 shows the data receiving method, it can also be considered that it shows a verification method (signature verification method).

In the data receiving apparatus 300, the sanitizable signature verification unit 310 verifies the sanitizable signature (Step S310). Specifically, the sanitizable signature verification unit 310 may verify the sanitizable signature by using the sanitizable signature, a public key corresponding to a private key for an ordinary signature, a public key for the sanitizable signature, and the already-processed data set (processing-target data). For example, the sanitizable signature verification unit 310 may verify the sanitizable signature by using a hash value generated for the already-processed data.

Further, for example, when the sanitizable signature is generated by a chameleon hash-based sanitizable signature, the sanitizable signature verification unit 310 may calculate, for each row, a hash value (message digest) for an attribute value (e.g., Attribute value #11 or the like) in a column (attribute) that is not to be processed by using an ordinary hash function (such as SHA 256). Further, the sanitizable signature generation unit 120 may calculate, for each row, a hash value for an attribute value (e.g., Attribute value #12 or the like) in a column (attribute) to be processed by a chameleon hash function by using a public key for the sanitizable signature.

In this case, the sanitizable signature verification unit 310 may generate h' by using a function hash2(pk, m', r '). Note that the function hash2( ) is a chameleon hash function: pk is a public key for a chameleon hash-based sanitizable signature; and m' is already-processed processing-target data. Further, r' is a random number corresponding to m'. Further, h' is a hash value corresponding to m'.

Further, the sanitizable signature verification unit 310 may calculate a hash value for a data sequence obtained by concatenating hash values for attribute values of respective attributes calculated for respective rows. That is, the sanitizable signature verification unit 310 may calculate a hash value for a data sequence obtained by concatenating a hash value(s) for an already-processed attribute value(s) of an attribute(s) to be processed and a hash value(s) for an attribute value(s) of an attribute(s) that is not to be processed. Then, the sanitizable signature verification unit 310 may verify the signature based on the calculated hash value and the sanitizable signature transmitted from the data processing apparatus 200 by using a public key corresponding to a private key for signature generation.

When the verification has succeeded, it is known that no illegitimate processing has occurred (i.e., has been made) for the data set by the data processing entity, and that the data passed from the data processing entity is based on the data of the data provider. On the other hand, when the verification has failed, it is known that there is a possibility that illegitimate processing has occurred (i.e., has been made) for the data set by the data processing entity, or false data other than that based on the data of the data provider is contained in the data passed from the data processing entity. Note that when the verification of the sanitizable signature has failed in the process in the step S310, the data receiving apparatus 300 does not have to perform the processes in the step S300 and the subsequent steps (S320 and S330). In other words, when the verification of the sanitizable signature has succeeded in the process in the step S310, the data receiving apparatus 300 may perform the processes in the steps S320 and S330.

The digital signature verification unit 320 verifies the digital signature (range proof signature) (Step S320). Specifically, the digital signature verification unit 320 verifies, for each attribute a of a record r, a digital signature (range proof signature) for each candidate/proof set that has been selected by the data processing apparatus 200 and transmitted to the data receiving apparatus 300. More specifically, the digital signature verification unit 320 may verify the digital signature (range proof signature) by, for example, a verification algorithm based on the above-described RSA, DSA, or the like. For example, the digital signature verification unit 320 may verify the signature by using a hash value generated for the candidate/proof set (r, a, $R_i$, $\sigma_i$), a public key (verification key), and a digital signature δ_(r, a, $R_i$, $\sigma_i$). In this way, the digital signature verification unit 320 verifies that the proof that the original attribute value x of the attribute a of the record r falls within the range candidate $R_i$ (range proof data $\sigma_i$) has certainly been generated by the data provider (data providing apparatus 100).

For example, in the first specific example shown in FIG. 8, it is assumed that the Attribute value #12="21" has been generalized to "Twenties (20 to 29 years old)" in the data processing apparatus 200. In this case, the digital signature verification unit 320 performs the verification by using a candidate/proof set (1, 2, $R_1$, $\sigma_1$) and a digital signature δ_(1, 2, $R_1$, $\sigma_1$) corresponding thereto. That is, the digital signature verification unit 320 verifies the first set (candidate/proof set) and the digital signature corresponding to the first set.

Further, for example, in the first specific example, it is assumed that the Attribute value #12="21" has been generalized to "20 to 22 years old" in the data processing apparatus 200. In this case, the digital signature verification unit 320 performs the verification by using a set of candidate/proof sets (1, 2, $R_1$, $\sigma_1$) and (1, 2, $R_4$, $\sigma_4$), and digital signatures δ_(1, 2, $R_1$, $\sigma_1$) and δ_(1, 2, $R_4$, $\sigma_4$) corresponding thereto. That is, the digital signature verification unit 320 verifies the second set (range proof set) and the digital signature corresponding to the second set.

When the verification has succeeded, it is known that no illegitimate processing has occurred (i.e., has been made) by the data processing entity for the candidate/proof set (range proof data), and that the candidate/proof set (range proof data) has been provided from the data provider. On the other hand, when the verification has failed, it is known that there is a possibility that illegitimate processing has occurred (i.e., has been made) for the candidate/proof set (range proof data) by the data processing entity, or the candidate/proof set (range proof data) is not one that has been provided from the data provider. Note that when the verification of the range proof signature has failed, the data receiving apparatus 300 does not have to perform the process in the step S330.

The range proof verification unit 330 verifies the range proof data (Step S330). Specifically, for each attribute a of a record r, the range proof verification unit 330 verifies range proof data σ for each candidate/proof set that has been selected by the data processing apparatus 200 and transmitted to the data receiving apparatus 300. That is, the range proof verification unit 330 verifies that the original attribute value x corresponding to the attribute a of the record r is included in (i.e., falls within) the range candidate R by using the range proof data σ.

For example, the range proof verification unit 330 verifies that the original attribute value x is included in the range candidate R by the below-shown Expression (4).

[Expression 4]

$$1 \ or \ 0 \leftarrow \mathrm{Verify}(\sigma, R, pp) \quad (4)$$

In Expression (4), Verify( ) is a function for verifying that the original attribute value x is included in the range candidate R by using the range proof data σ. The function Verify( ) is a function that uses a public parameter pp, range proof data σ, and a range candidate R corresponding to σ as inputs, and outputs "1" indicating that the verification has succeeded or "0" indicating that the verification has failed. Note that Verify( ) is the function corresponding to the function Gen( ) in the above-shown Expression (1). That is, Verify( ) is a function which is applied in the proof protocol to which Gen( ) used to generate the range proof data σ is applied, and is used by the data verifier or the like. The function Verify( ) can be determined as appropriate according to the algorithm of the proof protocol to be applied.

For example, it is assumed that the range proof data σ is generated by a function Gen( ) in a proof protocol based on zero-knowledge proof. In this case, the range proof verification unit 330 may verify the range proof data σ by using the function Verify( ) corresponding to Gen( ) in the proof protocol based on the zero-knowledge proof. Further, for example, it is assumed that the range proof data σ is generated by a function Gen( ) in a proof protocol based on zero-knowledge interactive proof (ZKIP). In this case, the range proof verification unit 330 may verify the range proof data σ by using the function Verify( ) corresponding to Gen( ) in the proof protocol based on the zero-knowledge interactive proof.

Further, it is assumed that the range proof data σ is generated by a function Gen( ) in a proof protocol based on non-interactive zero-knowledge proof (NIZK). In this case, the range proof verification unit 330 may verify the range proof data σ by using a function Verify( ) corresponding to Gen( ) in the proof protocol based on the non-interactive zero-knowledge proof. Further, it is assumed that the range proof data σ is generated by a function Gen( ) in a proof protocol other than the zero-knowledge proof. In this case, the range proof verification unit 330 may verify the range proof data σ by using a function Verify( ) corresponding to Gen( ) in a proof protocol other than the zero-knowledge proof.

For example, it is assumed that the range proof data σ is generated by the algorithm (CFT proof) based on non-interactive zero-knowledge proof shown in FIG. 9. In this case, Verify( ) corresponds to an algorithm by which Bob verifies, in the step 4, that x falls within a range expressed as $-2^{t+l}b \le x \le 2^{t+l}b$ by using (C, $D_1$, $D_2$) corresponding to the range proof data σ.

When the verification has succeeded, it is proved that the attribute value x has fallen within the range candidate R. Therefore, it is verified, together with the verification in the step S320, that no illegitimate processing has occurred (i.e., has been made) in the generalizing processing. On the other hand, when the verification has failed, it is not proven that the attribute value x has fallen within the range of the range candidate R, and there is a possibility that the attribute value x has not fallen within the range of the range candidate R. Therefore, there is a possibility that illegitimate processing has occurred (i.e., has been made) in the generalizing processing.

For example, in the first specific example shown in FIG. 8, when the Attribute value #12="21" has been generalized to "Twenties (20 to 29 years old)" in the data processing apparatus 200, the range proof verification unit 330 performs the verification by using the candidate/proof set (1, 2, $R_1$, $\sigma_1$). In other words, the range proof verification unit 330 verifies the range proof data by using the first set. That is, the range proof verification unit 330 verifies that the original Attribute value #12=x has fallen within the range of the range candidate $R_1$ by inputting the range proof data $\sigma_1$ and the range candidate $R_1$ into the function Verify( ).

Further, for example, in the first specific example, when the Attribute value #12="21" has been generalized to "20 to 22 years old" in the data processing apparatus 200, the range proof verification unit 330 performs verification by using a set of candidate/proof sets (1, 2, $R_1$, $\sigma_1$) and (1, 2, $R_4$, $\sigma_4$). In other words, the range proof verification unit 330 performs verification by using the second set (range proof set). That is, the range proof verification unit 330 verifies that the original Attribute value #12=x has fallen within the range of the range candidate $R_1$ by inputting the range proof data $\sigma_1$ and the range candidate $R_1$ into the function Verify( ). Further, the range proof verification unit 330 verifies that the original Attribute value #12=x has fallen within the range of the range candidate $R_4$ by inputting the range proof data $\sigma_4$ and the range candidate $R_4$ into the function Verify( ). In this way, the range proof verification unit 330 can verify that the Attribute value #12=x has fallen within both the range of the range candidate $R_1$ and the range of the candidate $R_4$. That is, the range proof verification unit 330 can verify that the generalized attribute value x' has fallen within a range expressed as $R_1 \cap R_4$.

As described above, in the information processing system 10 according to this example embodiment, the data providing apparatus 100 is configured to acquire a plurality of range proof data each of which is data for proving that the not-yet-processed attribute value falls within the range of the generalized attribute value. Further, the data processing apparatus 200 is configured to select range proof data corresponding to the range of the generalized attribute value. In this way, as described above, even when a sanitizable signature is performed (e.g., generated), it is possible to, in the data receiving apparatus 300, verify whether or not the original data has been appropriately generalized. Therefore, the information processing system 10 according to this example embodiment can appropriately process data.

Further, in this example embodiment, the digital signature verification unit 320 verifies, by using a range candidate selected by the data processing apparatus 200, and a range proof and a range proof signature corresponding thereto, the range proof signature. In contrast, in the technology according to Patent Literature 1, when verification is performed, a new hash value is generated from a hash value corresponding to already-processed data. In such a technology, when verification is performed, it is necessary to calculate a hash value according to the number of substitution candidates, i.e., the number of abstraction patterns. Therefore, as the number of abstraction patterns increases, the amount of the calculation of a hash value increases, so that the processing load may increase. In particular, it is necessary to increase the number of abstraction patterns in order to improve the flexibility of processing. Therefore, if it is attempted to achieve satisfactory processing flexibility, the processing load may increase. Therefore, in the technology in Patent Literature 1, there is a possibility that if it is attempted to achieve satisfactory processing flexibility, the processing cannot be efficiently performed.

In contrast, in this example embodiment, the information processing system or the like is configured so that the data provider acquires a plurality of range proof data each of which is data for proving that the not-yet-processed attribute value falls within the range of the generalized attribute value. Further, the system according to this example embodiment is configured so that the data processing entity selects range proof data corresponding to the range of the generalized attribute value. Further, the system according to this example embodiment is configured so that the data recipient performs verification by using range proof data selected by the data processing entity or the like. Therefore, in this example embodiment, when verification is performed, all that needs to be done is to perform the verification by using a range candidate $R_i$ selected by the data processing entity or the like, and a range proof $\sigma_i$ and a range proof signature δ corresponding thereto, so that the increase in the processing load is suppressed even when the number of range candidates increases. Therefore, in this example embodiment, it is possible to efficiently perform a process while achieving satisfactory processing flexibility.

Example of Hardware Configuration

An example of a configuration of hardware resources for implementing an apparatus and a system according to the above-described example embodiment by using one calculation processing apparatus (an information processing apparatus or a computer) will be described. However, the apparatus according to any of the example embodiments (i.e., a data providing apparatus, a data processing apparatus, and a data receiving apparatus) may be physically or functionally implemented by using at least two calculation processing apparatus. Further, the apparatus according to any of the example embodiments may be implemented as a dedicated apparatus or as a general-purpose information processing apparatus.

Figure 12:
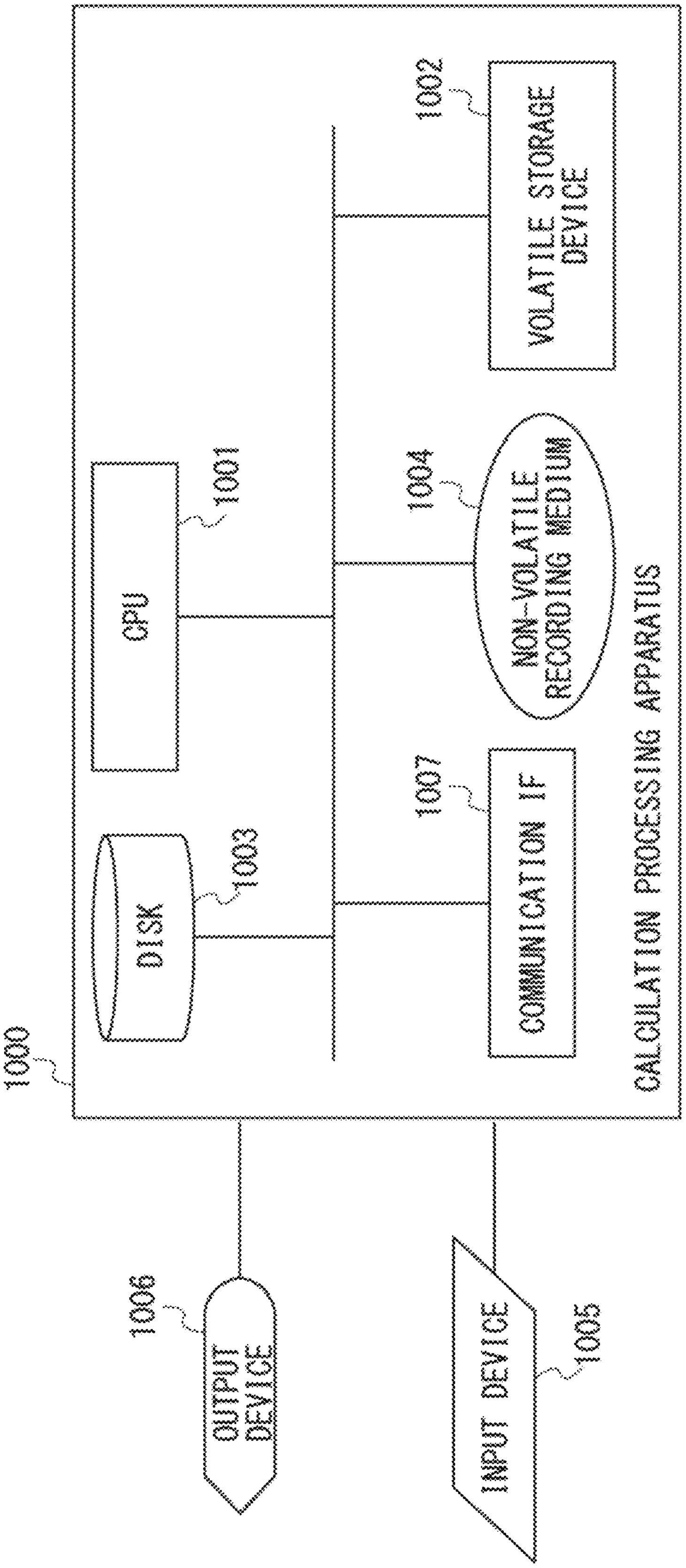
FIG. 12 is a block diagram schematically showing an example of a hardware configuration of a calculation processing apparatus capable of implementing an apparatus and a system according to each example embodiment.

FIG. 12 is a block diagram schematically showing an example of a hardware configuration of a calculation processing apparatus capable of implementing an apparatus or a system according to an example embodiment. A calculation processing apparatus 1000 includes a CPU 1001, a volatile storage device 1002, a disk 1003, a nonvolatile recording medium 1004, and a communication IF (IF: Interface) 1007. Therefore, it can be said that the apparatus according to any of the example embodiments includes the CPU 1001, the volatile storage device 1002, the disk 1003, the nonvolatile recording medium 1004, and the communication IF 1007. The calculation processing apparatus 1000 may be configured so that it can be connected to an input device 1005 and an output device 1006. The calculation processing apparatus 1000 may include the input device 1005 and the output device 1006. Further, the calculation processing apparatus 1000 may transmit/receive information to/from other calculation processing apparatuses and communication apparatuses through the communication IF 1007.

The nonvolatile recording medium 1004 is, for example, a computer readable CD (Compact Disc) or a computer readable DVD (Digital Versatile Disc). Further, the nonvolatile recording medium 1004 may be a USB (Universal Serial Bus) memory, an SSD (Solid State Drive), or the like. The nonvolatile recording medium 1004 holds (i.e., retains) a relevant program(s) even when no electric power is supplied, thus enabling the program(s) to be carried and transported. Note that the nonvolatile recording medium 1004 is not limited to the above-described media. Alternatively, instead of using the nonvolatile recording medium 1004, the relevant program(s) may be supplied through the communication IF 1007 and a communication network(s).

The volatile storage device 1002 can be read by a computer, and can temporarily store data. The volatile storage device 1002 is a memory or the like such as a DRAM (dynamic random access memory) or an SRAM (static random access memory).

That is, the CPU 1001 copies (i.e., loads) a software program (a computer program: hereinafter also simply referred to as a "program") stored in the disc 1003 into the volatile storage device 1002 when it executes the program, and thereby performs arithmetic processing. The CPU 1001 reads data necessary for executing the program from the volatile storage device 1002. When it is necessary to display an output result, the CPU 1001 displays the output result on the output device 1006. When a program is input from the outside, the CPU 1001 acquires the program through the input device 1005. The CPU 1001 interprets and executes programs corresponding to the above-described functions (the processes) of the respective components shown in FIGS. 3 to 5. The CPU 1001 performs the processes described in each of the above-described example embodiments. In other words, the above-described functions of the respective components shown in FIGS. 3 to 5 can be implemented by having the CPU 1001 execute a program(s) stored in the disc 1003 or the volatile storage device 1002.

That is, it can be considered that each example embodiment can be accomplished by the above-described program. Further, it can be considered that each of the above-described example embodiments can also be accomplished by a nonvolatile recording medium which can be read by a computer and in which the above-described program is recorded.

Modified Example

Note that the present invention is not limited to the above-described example embodiments, and they may be modified as appropriate without departing from the scope and spirit of the invention. For example, in the above-described flowcharts, the order of processes (steps) can be changed as appropriate. Further, at least one of a plurality of processes (steps) may be omitted (or skipped). For example, in the flowchart shown in FIG. 10, the order of the processes in the S210 and S220 is arbitrarily determined. Further, in the flowchart shown in FIG. 11, the order of the processes in the S330 and S330 is arbitrarily determined.

In the above-described examples, the program includes a set of instructions (or software codes) that, when being loaded into a computer, causes the computer to perform one or more of the functions described in the example embodiments. The program may be stored in a non-transitory computer readable medium or in a physical storage medium. By way of example rather than limitation, a computer readable medium or a physical storage medium may include a random-access memory (RAM), a read-only memory (ROM), a flash memory, a solid-state drive (SSD), or other memory technology, a CD-ROM, a digital versatile disk (DVD), a Blu-ray (registered trademark) disc or other optical disc storages, a magnetic cassette, magnetic tape, and a magnetic disc storage or other magnetic storage devices. The program may be transmitted on a transitory computer readable medium or a communication medium. By way of example rather than limitation, the transitory computer readable medium or the communication medium may include electrical, optical, acoustic, or other forms of propagating signals.

Although the present invention is described above with reference to example embodiments, the present invention is not limited to the above-described example embodiments. Various modifications that can be understood by those skilled in the art can be made to the configuration and details of the present invention within the scope and spirit of the invention.

The whole or part of the example embodiments disclosed above can be described as, but not limited to, the following supplementary notes.

(Supplementary Note 1)

An information processing system comprising:

a data providing apparatus configured to provide a data set including a plurality of data about at least one attribute:

a data processing apparatus configured to process at least one of the plurality of data; and a data receiving apparatus configured to receive the data set of which at least one data has already been processed, wherein the data providing apparatus comprises:

sanitizable signature generation means for generating a sanitizable signature with which it is possible to perform arbitrary generalizing processing for processing-target data that is permitted to be processed;

range proof acquisition means for acquiring a plurality of range proof data, each of the plurality of range proof data being data for proving that when generalizing processing is performed for an attribute value of the processing-target data, the not-yet-processed attribute value falls within a range of a generalized attribute value;

signature generation means for generating a digital signature for each of the range proof data; and first transmitting means for transmitting the data set, the sanitizable signature, the range proof data, and the digital signature to the data processing apparatus, the data processing apparatus comprises:

processing performing means for performing a process for performing generalizing processing for the processing-target data;

sanitizable signature processing means for performing a process for the sanitizable signature by using the not-yet-processed processing-target data and the already-processed processing-target data;

range proof selecting means for selecting, for each of the processing-target data that have been subjected to the generalizing processing, the range proof data corresponding to the range of the generalized attribute value from among the plurality of the range proof data; and second transmitting means for transmitting, to the data receiving apparatus, the data set of which the processing-target data have already been processed, the processed sanitizable signature, the range proof data selected for the respective processing-target data, and the digital signatures corresponding to the respective range proof data, and the data receiving apparatus comprises:

sanitizable signature verification means for verifying the data set of which the processing-target data have already been processed and the sanitizable signature processed by the data processing apparatus;

digital signature verification means for verifying the digital signatures corresponding to the range proof data selected by the data processing apparatus; and range proof verification means for verifying the range proof data selected by the data processing apparatus.

(Supplementary Note 2)

The information processing system described in Supplementary note 1, wherein the range proof acquisition means generates the plurality of range proof data.

(Supplementary Note 3)

The information processing system described in Supplementary note 2, wherein the range proof acquisition means generates the range proof data for each of a plurality of candidates for a range in which the attribute value of the processing-target data is included, and the range proof selecting means selects the range proof data for the candidate corresponding to the range of the generalized attribute value.

(Supplementary Note 4)

The information processing system described in Supplementary note 3, wherein the signature generation means generates the digital signature for each of first sets each consisting of the candidate and the range proof data corresponding to this candidate, the first transmitting means transmits the plurality of first sets and the digital signatures corresponding to the first sets to the data processing apparatus, the range proof selecting means selects at least one first set corresponding to the range of the generalized attribute value from among the plurality of first sets, the second transmitting means transmits the selected first set and the digital signature corresponding to the selected first set to the data receiving apparatus, the digital signature verification means verifies the first set and the digital signature corresponding to this first set, and the range proof verification means verifies the range proof data by using the first set.

(Supplementary Note 5)

The information processing system described in Supplementary note 4, wherein when there is a first set including the candidate for the range that coincides with the range of the generalized attribute value, the range proof selecting means selects this first set.

(Supplementary Note 6)

The information processing system described in Supplementary note 5, wherein when there is no first set including the candidate for the range that coincides with the range of the generalized attribute value, but the range of the generalized attribute value is expressed by a combination of a plurality of candidates, the range proof selecting means selects a second set, the second set being a combination of first sets corresponding to the plurality of the candidates, the second transmitting means transmits the selected second set and the digital signature corresponding to the selected second set to the data receiving apparatus, the digital signature verification means verifies the selected second set and the digital signature corresponding to this second set, and the range proof verification means verifies the range proof data by using the selected second set.

(Supplementary Note 7)

The information processing system described in any one of Supplementary notes 4 to 6, wherein the first set includes identification information of the processing-target data corresponding thereto.

(Supplementary Note 8)

The information processing system described in any one of Supplementary notes 2 to 7, wherein the range proof acquisition means generates the range proof data by using a proof protocol based on non-interactive zero-knowledge proof, and the range proof verification means verifies the range proof data by using the proof protocol based on non-interactive zero-knowledge proof.

(Supplementary Note 9)

A data providing apparatus comprising:

sanitizable signature generation means for generating a sanitizable signature with which it is possible to perform arbitrary generalizing processing for processing-target data that is permitted to be processed, the processing-target data being data included in a data set including a plurality of data about at least one attribute;

range proof acquisition means for acquiring a plurality of range proof data, each of the plurality of range proof data being data for proving that when generalizing processing is performed for an attribute value of the processing-target data, the not-yet-processed attribute value falls within a range of a generalized attribute value;

signature generation means for generating a digital signature for each of the plurality of range proof data; and transmitting means for transmitting the data set, the sanitizable signature, the range proof data, and the digital signatures corresponding to the range proof data to a data processing apparatus, the data processing apparatus being configured to process at least one of the plurality of data.

(Supplementary Note 10)

The data providing apparatus described in Supplementary note 9, wherein the range proof acquisition means generates the plurality of range proof data.

(Supplementary Note 11)

The data providing apparatus described in Supplementary note 10, wherein the range proof acquisition means generates the range proof data for each of a plurality of candidates for a range in which the attribute value of the processing-target data is included.

(Supplementary Note 12)

The data providing apparatus described in Supplementary note 11, wherein the signature generation means generates the digital signature for a first set of the candidate and the range proof data corresponding to this candidate, and the transmitting means transmits the first set and the digital signature corresponding to this first set to the data processing apparatus.

(Supplementary Note 13)

The data providing apparatus described in Supplementary note 12, wherein the first set includes identification information of the processing-target data corresponding thereto.

(Supplementary Note 14)

The data providing apparatus described in any one of Supplementary notes 10 to 13, wherein the range proof acquisition means generates the range proof data by using a proof protocol based on non-interactive zero-knowledge proof.

(Supplementary Note 15)

A data processing apparatus comprising:

processing performing means for performing a process for performing generalizing processing for processing-target data that is permitted to be processed, the processing-target data being data included in a data set including a plurality of data about at least one attribute, provided by a data providing apparatus, the data providing apparatus being configured to provide the data set;

sanitizable signature processing means for performing a process for a sanitizable signature by using the not-yet-processed processing-target data and the already-processed processing-target data, the sanitizable signature being generated for the processing-target data by the data providing apparatus and being a signature with which it is possible to perform arbitrary generalizing processing therefor;

range proof selecting means for selecting, from among a plurality of range proof data acquired by the data providing apparatus, one corresponding to a range of a generalized attribute value for each of the processing-target data that have been subjected to the generalizing processing, each of the plurality of range proof data being data for proving that a not-yet-processed attribute value falls within the range of the generalized attribute value; and transmitting means for transmitting, to a data receiving apparatus, the data set of which the processing-target data have already been processed, the processed sanitizable signature, the range proof data selected for the respective processing-target data, and the digital signatures generated by the data providing apparatus and corresponding to the respective range proof data, the data receiving apparatus being configured to receive the data set of which at least one data has already been processed.

(Supplementary Note 16)

The data processing apparatus described in Supplementary note 15, wherein the range proof selecting means selects the range proof data for the candidate corresponding to the range of the generalized attribute value from among the plurality of range proof data each of which is generated for a respective one of a plurality of candidates for a range in which the attribute value of the processing-target data is included.

(Supplementary Note 17)

The data processing apparatus described in Supplementary note 16, wherein the range proof selecting means selects, from among a plurality of first sets each consisting of the candidate and the range proof data corresponding to this candidate, at least one first set corresponding to the range of the generalized attribute value, and the transmitting means transmits the selected first set and the digital signature generated for the selected first set to the data receiving apparatus.

(Supplementary Note 18)

The data processing apparatus described in Supplementary note 17, wherein when there is a first set including the candidate for the range that coincides with the range of the generalized attribute value, the range proof selecting means selects this first set.

(Supplementary Note 19)

The data processing apparatus described in Supplementary note 18, wherein when there is no first set including the candidate for the range that coincides with the range of the generalized attribute value, but the range of the generalized attribute value is expressed by a combination of a plurality of candidates, the range proof selecting means selects a second set, the second set being a combination of first sets corresponding to the plurality of the candidates, the transmitting means transmits the selected second set and the digital signature corresponding to the selected second set to the data receiving apparatus.

(Supplementary Note 20)

The data processing apparatus described in any one of Supplementary notes 17 to 19, wherein the first set includes identification information of the processing-target data corresponding thereto.

(Supplementary Note 21)

A data receiving apparatus comprising:

sanitizable signature verification means for verifying a data set including a plurality of data about at least one attribute and a sanitizable signature, the data set being provided by a data providing apparatus and of which processing-target data that is permitted to be processed has already been processed by a data processing apparatus, the sanitizable signature being obtained by processing, by the data processing apparatus, a sanitizable signature which is generated for the processing-target data by the data providing apparatus and with which it is possible to perform arbitrary generalizing processing therefor, and the data providing apparatus being configured to provide the data set;

digital signature verification means for verifying, for each of the processing-target data that have been subjected to the generalizing processing, a digital signature corresponding to, among a plurality of range proof data acquired by the data providing apparatus, one selected by the data processing apparatus, each of the plurality of range proof data being data for proving that a not-yet-processed attribute value falls within a range of a generalized attribute value; and range proof verification means for verifying the range proof data selected by the data processing apparatus.

(Supplementary Note 22)

The data receiving apparatus described in Supplementary note 21, wherein the digital signature verification means verifies a first set and the digital signature generated for the first set, the first set being a set of a candidate for a range in which the attribute value of the processing-target data is included and range proof data corresponding to this candidate, selected by the data processing apparatus, and the range proof verification means verifies the range proof data by using the first set.

(Supplementary Note 23)

The data receiving apparatus described in Supplementary note 22, wherein the digital signature verification means verifies a second set and the digital signature corresponding to this second set, the second set being a combination of first sets corresponding to the plurality of candidates, selected by the data processing apparatus, and the range proof verification means verifies the range proof data by using the selected second set.

(Supplementary Note 24)

The data receiving apparatus described in Supplementary note 22 or 23, wherein the first set includes identification information of the processing-target data corresponding thereto.

(Supplementary Note 25)

The data receiving apparatus described in any one of Supplementary notes 21 to 24, wherein the range proof verification means verifies the range proof data by using a proof protocol based on non-interactive zero-knowledge proof.

(Supplementary Note 26)

An information processing method comprising:

by a data providing apparatus configured to provide a data set including a plurality of data about at least one attribute, generating a sanitizable signature with which it is possible to perform arbitrary generalizing processing for processing-target data that is permitted to be processed;

acquiring a plurality of range proof data, each of the plurality of range proof data being data for proving that when generalizing processing is performed for an attribute value of the processing-target data, the not-yet-processed attribute value falls within a range of a generalized attribute value;

generating a digital signature for each of the range proof data; and transmitting the data set, the sanitizable signature, the range proof data, and the digital signature to a data processing apparatus, the data processing apparatus being configured to process at least one of the plurality of data, by the data processing apparatus, performing a process for performing generalizing processing for the processing-target data;

performing a process for the sanitizable signature by using the not-yet-processed processing-target data and the already-processed processing-target data;

selecting, for each of the processing-target data that have been subjected to the generalizing processing, the range proof data corresponding to the range of the generalized attribute value from among the plurality of the range proof data; and transmitting, to a data receiving apparatus, the data set of which the processing-target data have already been processed, the processed sanitizable signature, the range proof data selected for the respective processing-target data, and the digital signatures corresponding to the respective range proof data, the data receiving apparatus being configured to receive the data set of which at least one data has already been processed, and by the data receiving apparatus, verifying the data set of which the processing-target data have already been processed and the sanitizable signature processed by the data processing apparatus;

verifying the digital signatures corresponding to the range proof data selected by the data processing apparatus; and verifying the range proof data selected by the data processing apparatus.

(Supplementary Note 27)

A data providing method comprising:

generating a sanitizable signature with which it is possible to perform arbitrary generalizing processing for processing-target data that is permitted to be processed, the processing-target data being data included in a data set including a plurality of data about at least one attribute;

acquiring a plurality of range proof data, each of the plurality of range proof data being data for proving that when generalizing processing is performed for an attribute value of the processing-target data, the not-yet-processed attribute value falls within a range of a generalized attribute value;

generating a digital signature for each of the plurality of range proof data; and transmitting the data set, the sanitizable signature, the range proof data, and the digital signatures corresponding to the range proof data to a data processing apparatus, the data processing apparatus being configured to process at least one of the plurality of data.

(Supplementary Note 28)

A data processing method comprising:

performing a process for performing generalizing processing for processing-target data that is permitted to be processed, the processing-target data being data included in a data set including a plurality of data about at least one attribute, provided by a data providing apparatus, the data providing apparatus being configured to provide the data set;

performing a process for a sanitizable signature by using the not-yet-processed processing-target data and the already-processed processing-target data, the sanitizable signature being generated for the processing-target data by the data providing apparatus and being a signature with which it is possible to perform arbitrary generalizing processing therefor;

selecting, from among a plurality of range proof data acquired by the data providing apparatus, one corresponding to a range of a generalized attribute value for each of the processing-target data that have been subjected to the generalizing processing, each of the plurality of range proof data being data for proving that a not-vet-processed attribute value falls within the range of the generalized attribute value; and transmitting, to a data receiving apparatus, the data set of which the processing-target data have already been processed, the processed sanitizable signature, the range proof data selected for the respective processing-target data, and the digital signatures generated by the data providing apparatus and corresponding to the respective range proof data, the data receiving apparatus being configured to receive the data set of which at least one data has already been processed.

(Supplementary Note 29)

A data receiving method comprising:

verifying a data set including a plurality of data about at least one attribute and a sanitizable signature, the data set being provided by a data providing apparatus and of which processing-target data that is permitted to be processed has already been processed by a data processing apparatus, the sanitizable signature being obtained by processing, by the data processing apparatus, a sanitizable signature which is generated for the processing-target data by the data providing apparatus and with which it is possible to perform arbitrary generalizing processing therefor, and the data providing apparatus being configured to provide the data set;

verifying, for each of the processing-target data that have been subjected to the generalizing processing, a digital signature corresponding to, among a plurality of range proof data acquired by the data providing apparatus, one selected by the data processing apparatus, each of the plurality of range proof data being data for proving that a not-yet-processed attribute value falls within a range of a generalized attribute value; and verifying the range proof data selected by the data processing apparatus.

(Supplementary Note 30)

A non-transitory computer readable medium storing a program for causing a computer to perform:

a step of generating a sanitizable signature with which it is possible to perform arbitrary generalizing processing for processing-target data that is permitted to be processed, the processing-target data being data included in a data set including a plurality of data about at least one attribute;

a step of acquiring a plurality of range proof data, each of the plurality of range proof data being data for proving that when generalizing processing is performed for an attribute value of the processing-target data, the not-yet-processed attribute value falls within a range of a generalized attribute value;

a step of generating a digital signature for each of the plurality of range proof data; and a step of transmitting the data set, the sanitizable signature, the range proof data, and the digital signatures corresponding to the range proof data to a data processing apparatus, the data processing apparatus being configured to process at least one of the plurality of data.

(Supplementary Note 31)

A non-transitory computer readable medium storing a program for causing a computer to perform:

a step of performing a process for performing generalizing processing for processing-target data that is permitted to be processed, the processing-target data being data included in a data set including a plurality of data about at least one attribute, provided by a data providing apparatus, the data providing apparatus being configured to provide the data set;

a step of performing a process for a sanitizable signature by using the not-yet-processed processing-target data and the already-processed processing-target data, the sanitizable signature being generated for the processing-target data by the data providing apparatus and being a signature with which it is possible to perform arbitrary generalizing processing therefor;

a step of selecting, from among a plurality of range proof data acquired by the data providing apparatus, one corresponding to a range of a generalized attribute value for each of the processing-target data that have been subjected to the generalizing processing, each of the plurality of range proof data being data for proving that a not-yet-processed attribute value falls within the range of the generalized attribute value; and a step of transmitting, to a data receiving apparatus, the data set of which the processing-target data have already been processed, the processed sanitizable signature, the range proof data selected for the respective processing-target data, and the digital signatures generated by the data providing apparatus and corresponding to the respective range proof data, the data receiving apparatus being configured to receive the data set of which at least one data has already been processed.

(Supplementary Note 32)

A non-transitory computer readable medium storing a program for causing a computer to perform:

a step of verifying a data set including a plurality of data about at least one attribute and a sanitizable signature, the data set being provided by a data providing apparatus and of which processing-target data that is permitted to be processed has already been processed by a data processing apparatus, the sanitizable signature being obtained by processing, by the data processing apparatus, a sanitizable signature which is generated for the processing-target data by the data providing apparatus and with which it is possible to perform arbitrary generalizing processing therefor, and the data providing apparatus being configured to provide the data set;

a step of verifying, for each of the processing-target data that have been subjected to the generalizing processing, a digital signature corresponding to, among a plurality of range proof data acquired by the data providing apparatus, one selected by the data processing apparatus, each of the plurality of range proof data being data for proving that a not-yet-processed attribute value falls within a range of a generalized attribute value; and a step of verifying the range proof data selected by the data processing apparatus.

REFERENCE SIGNS LIST

10 INFORMATION PROCESSING SYSTEM
100 DATA PROVIDING APPARATUS
120 SANITIZABLE SIGNATURE GENERATION UNIT
130 RANGE PROOF ACQUISITION UNIT
140 SIGNATURE GENERATION UNIT
150 TRANSMITTING UNIT
200 DATA PROCESSING APPARATUS
210 PROCESSING PERFORMING UNIT
220 SANITIZABLE SIGNATURE PROCESSING UNIT
230 RANGE PROOF SELECTING UNIT
240 TRANSMITTING UNIT
300 DATA RECEIVING APPARATUS
310 SANITIZABLE SIGNATURE VERIFICATION UNIT
320 DIGITAL SIGNATURE VERIFICATION UNIT
330 RANGE PROOF VERIFICATION UNIT

What is claimed is:

1. An information processing system comprising:

a data providing apparatus configured to provide a data set including a plurality of data about at least one attribute;

a data processing apparatus configured to process at least one of the plurality of data; and a data receiving apparatus configured to receive the data set of which at least one data has already been processed, wherein the data providing apparatus comprises:

at least one first memory configured to store instructions; and at least one first processor configured to execute the instructions to:

generate a sanitizable signature with which it is possible to perform arbitrary generalizing processing for processing-target data that is permitted to be processed;

acquire a plurality of range proof data, each of the plurality of range proof data being data for proving that when generalizing processing is performed for an attribute value of the processing-target data, the attribute value before processed falls within a range of a generalized attribute value;

generate a digital signature for each of the range proof data; and transmit the data set, the sanitizable signature, the range proof data, and the digital signature to the data processing apparatus, the data processing apparatus comprises:

at least one second memory configured to store instructions; and at least one second processor configured to execute the instructions to:

perform a process for performing generalizing processing for the processing-target data;

perform a process for the sanitizable signature by using the processing-target data before processed and the processing-target data after processed;

select, for each of the processing-target data that have been subjected to the generalizing processing, the range proof data corresponding to the range of the generalized attribute value from among the plurality of the range proof data; and transmit, to the data receiving apparatus, the data set of which the processing-target data have already been processed, the processed sanitizable signature, the range proof data selected for the respective processing-target data, and the digital signatures corresponding to the respective range proof data, and the data receiving apparatus comprises:

at least one third memory configured to store instructions; and at least one third processor configured to execute the instructions to:

verify the data set of which the processing-target data have already been processed and the sanitizable signature processed by the data processing apparatus;

verify the digital signatures corresponding to the range proof data selected by the data processing apparatus; and verify the range proof data selected by the data processing apparatus.

2. The information processing system according to claim 1, wherein the at least one first processor is further configured to execute the instructions to generate the plurality of range proof data.

3. The information processing system according to claim 2, wherein the at least one first processor is further configured to execute the instructions to generate the range proof data for each of a plurality of candidates for a range in which the attribute value of the processing-target data is included, and the at least one second processor is further configured to execute the instructions to select the range proof data for the candidate corresponding to the range of the generalized attribute value.

4. The information processing system according to claim 3, wherein the at least one first processor is further configured to execute the instructions to generate the digital signature for each of first sets each consisting of the candidate and the range proof data corresponding to this candidate, the at least one first processor is further configured to execute the instructions to transmit the plurality of first sets and the digital signatures corresponding to the first sets to the data processing apparatus, the at least one second processor is further configured to execute the instructions to select at least one first set corresponding to the range of the generalized attribute value from among the plurality of first sets, the at least one second processor is further configured to execute the instructions to transmit the selected first set and the digital signature corresponding to the selected first set to the data receiving apparatus, the at least one third processor is further configured to execute the instructions to verify the first set and the digital signature corresponding to this first set, and the at least one third processor is further configured to execute the instructions to verify the range proof data by using the first set.

5. The information processing system according to claim 4, wherein when there is a first set including the candidate for the range that coincides with the range of the generalized attribute value, the at least one second processor is further configured to execute the instructions to select this first set.

6. The information processing system according to claim 5, wherein when there is no first set including the candidate for the range that coincides with the range of the generalized attribute value, but the range of the generalized attribute value is expressed by a combination of a plurality of candidates, the at least one second processor is further configured to execute the instructions to select a second set, the second set being a combination of first sets corresponding to the plurality of the candidates, the at least one second processor is further configured to execute the instructions to transmit the selected second set and the digital signature corresponding to the selected second set to the data receiving apparatus, the at least one third processor is further configured to execute the instructions to verify the selected second set and the digital signature corresponding to this second set, and the at least one third processor is further configured to execute the instructions to verify the range proof data by using the selected second set.

7. The information processing system according to claim 4, wherein the first set includes identification information of the processing-target data corresponding thereto.

8. The information processing system according to claim 2, wherein the at least one first processor is further configured to execute the instructions to generate the range proof data by using a proof protocol based on non-interactive zero-knowledge proof, and the at least one third processor is further configured to execute the instructions to verify the range proof data by using the proof protocol based on non-interactive zero-knowledge proof.

9. A data providing apparatus comprising:

at least one memory configured to store instructions; and at least one processor configured to execute the instructions to:

generate a sanitizable signature with which it is possible to perform arbitrary generalizing processing for processing-target data that is permitted to be processed, the processing-target data being data included in a data set including a plurality of data about at least one attribute;

acquire a plurality of range proof data, each of the plurality of range proof data being data for proving that when generalizing processing is performed for an attribute value of the processing-target data, the attribute value before processed falls within a range of a generalized attribute value;

generate a digital signature for each of the plurality of range proof data; and transmit the data set, the sanitizable signature, the range proof data, and the digital signatures corresponding to the range proof data to a data processing apparatus, the data processing apparatus being configured to process at least one of the plurality of data.

10. The data providing apparatus according to claim 9, wherein the at least one processor is further configured to execute the instructions to generate the plurality of range proof data.

11. The data providing apparatus according to claim 10, wherein the at least one processor is further configured to execute the instructions to generate the range proof data for each of a plurality of candidates for a range in which the attribute value of the processing-target data is included.

12. The data providing apparatus according to claim 11, wherein the at least one processor is further configured to execute the instructions to generate the digital signature for a first set of the candidate and the range proof data corresponding to this candidate, and the at least one processor is further configured to execute the instructions to transmit the first set and the digital signature corresponding to this first set to the data processing apparatus.

13. The data providing apparatus according to claim 12, wherein the first set includes identification information of the processing-target data corresponding thereto.

14. The data providing apparatus according to claim 10, wherein the at least one processor is further configured to execute the instructions to generate the range proof data by using a proof protocol based on non-interactive zero-knowledge proof.

15. A data processing apparatus comprising:

at least one memory configured to store instructions; and at least one processor configured to execute the instructions to:

perform a process for performing generalizing processing for processing-target data that is permitted to be processed, the processing-target data being data included in a data set including a plurality of data about at least one attribute, provided by a data providing apparatus, the data providing apparatus being configured to provide the data set;

perform a process for a sanitizable signature by using the processing-target data before processed and the processing-target data after processed, the sanitizable signature being generated for the processing-target data by the data providing apparatus and being a signature with which it is possible to perform arbitrary generalizing processing therefor;

select, from among a plurality of range proof data acquired by the data providing apparatus, one corresponding to a range of a generalized attribute value for each of the processing-target data that have been subjected to the generalizing processing, each of the plurality of range proof data being data for proving that a not-yet-processed attribute value falls within the range of the generalized attribute value; and transmit, to a data receiving apparatus, the data set of which the processing-target data have already been processed, the processed sanitizable signature, the range proof data selected for the respective processing-target data, and the digital signatures generated by the data providing apparatus and corresponding to the respective range proof data, the data receiving apparatus being configured to receive the data set of which at least one data has already been processed.

16. The data processing apparatus according to claim 15, wherein the at least one processor is further configured to execute the instructions to select the range proof data for the candidate corresponding to the range of the generalized attribute value from among the plurality of range proof data each of which is generated for a respective one of a plurality of candidates for a range in which the attribute value of the processing-target data is included.

17. The data processing apparatus according to claim 16, wherein the at least one processor is further configured to execute the instructions to select, from among a plurality of first sets each consisting of the candidate and the range proof data corresponding to this candidate, at least one first set corresponding to the range of the generalized attribute value, and the at least one processor is further configured to execute the instructions to transmit the selected first set and the digital signature generated for the selected first set to the data receiving apparatus.

18. The data processing apparatus according to claim 17, wherein when there is a first set including the candidate for the range that coincides with the range of the generalized attribute value, the at least one processor is further configured to execute the instructions to select this first set.

19. The data processing apparatus according to claim 18, wherein when there is no first set including the candidate for the range that coincides with the range of the generalized attribute value, but the range of the generalized attribute value is expressed by a combination of a plurality of candidates, the at least one processor is further configured to execute the instructions to select a second set, the second set being a combination of first sets corresponding to the plurality of the candidates, the at least one processor is further configured to execute the instructions to transmit the selected second set and the digital signature corresponding to the selected second set to the data receiving apparatus.

20. The data processing apparatus according to claim 17, wherein the first set includes identification information of the processing-target data corresponding thereto.

21. A data receiving apparatus comprising:

at least one memory configured to store instructions; and at least one processor configured to execute the instructions to:

verify a data set including a plurality of data about at least one attribute and a sanitizable signature, the data set being provided by a data providing apparatus and of which processing-target data that is permitted to be processed has already been processed by a data processing apparatus, the sanitizable signature being obtained by processing, by the data processing apparatus, a sanitizable signature which is generated for the processing-target data by the data providing apparatus and with which it is possible to perform arbitrary generalizing processing therefor, and the data providing apparatus being configured to provide the data set;

verify, for each of the processing-target data that have been subjected to the generalizing processing, a digital signature corresponding to, among a plurality of range proof data acquired by the data providing apparatus, one selected by the data processing apparatus, each of the plurality of range proof data being data for proving that a not-yet-processed attribute value falls within a range of a generalized attribute value; and verify the range proof data selected by the data processing apparatus.

22. The data receiving apparatus according to claim 21, wherein the at least one processor is further configured to execute the instructions to verify a first set and the digital signature generated for the first set, the first set being a set of a candidate for a range in which the attribute value of the processing-target data is included and range proof data corresponding to this candidate, selected by the data processing apparatus, and the at least one processor is further configured to execute the instructions to verify the range proof data by using the first set.

23. The data receiving apparatus according to claim 22, wherein the at least one processor is further configured to execute the instructions to verify a second set and the digital signature corresponding to this second set, the second set being a combination of first sets corresponding to the plurality of candidates, selected by the data processing apparatus, and the at least one processor is further configured to execute the instructions to verify the range proof data by using the selected second set.

24. The data receiving apparatus according to claim 22, wherein the first set includes identification information of the processing-target data corresponding thereto.

25. The data receiving apparatus according to claim 21, wherein the at least one processor is further configured to execute the instructions to verify the range proof data by using a proof protocol based on non-interactive zero-knowledge proof.

26. An information processing method comprising:

by a data providing apparatus configured to provide a data set including a plurality of data about at least one attribute, generating a sanitizable signature with which it is possible to perform arbitrary generalizing processing for processing-target data that is permitted to be processed;

acquiring a plurality of range proof data, each of the plurality of range proof data being data for proving that when generalizing processing is performed for an attribute value of the processing-target data, the attribute value before processed falls within a range of a generalized attribute value;

generating a digital signature for each of the range proof data; and transmitting the data set, the sanitizable signature, the range proof data, and the digital signature to a data processing apparatus, the data processing apparatus being configured to process at least one of the plurality of data, by the data processing apparatus, performing a process for performing generalizing processing for the processing-target data;

performing a process for the sanitizable signature by using the processing-target data before processed and the processing-target data after processed;

selecting, for each of the processing-target data that have been subjected to the generalizing processing, the range proof data corresponding to the range of the generalized attribute value from among the plurality of the range proof data; and transmitting, to a data receiving apparatus, the data set of which the processing-target data have already been processed, the processed sanitizable signature, the range proof data selected for the respective processing-target data, and the digital signatures corresponding to the respective range proof data, the data receiving apparatus being configured to receive the data set of which at least one data has already been processed, and by the data receiving apparatus, verifying the data set of which the processing-target data have already been processed and the sanitizable signature processed by the data processing apparatus;

verifying the digital signatures corresponding to the range proof data selected by the data processing apparatus; and verifying the range proof data selected by the data processing apparatus.

* * * * *